United States Patent
Hara et al.

(10) Patent No.: US 10,027,248 B2
(45) Date of Patent: Jul. 17, 2018

(54) ELECTRIC POWER CONVERSION CIRCUIT INCLUDING SWITCHES AND REACTORS, AND ELECTRIC POWER CONVERSION DEVICE INCLUDING ELECTRIC POWER CONVERSION CIRCUIT AND CONTROL CIRCUIT

(71) Applicant: Panasonic Intellectual Property Management Co., Ltd., Osaka (JP)

(72) Inventors: Shoichi Hara, Tokyo (JP); Atsushi Yamamoto, Kyoto (JP); Taiki Nishimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/597,177

(22) Filed: May 17, 2017

(65) Prior Publication Data

US 2017/0358998 A1 Dec. 14, 2017

(30) Foreign Application Priority Data

Jun. 14, 2016 (JP) ................. 2016-118195

(51) Int. Cl.
*H02M 7/5387* (2007.01)
*H02M 7/48* (2007.01)
(Continued)

(52) U.S. Cl.
CPC .............. *H02M 7/48* (2013.01); *H02M 7/12* (2013.01); *H02M 3/1582* (2013.01)

(58) Field of Classification Search
CPC .......... H02M 1/32; H02M 3/22; H02M 3/335; H02M 3/33569; H02M 3/33507;
(Continued)

(56) References Cited

U.S. PATENT DOCUMENTS 6,330,170 B1 * 12/2001 Wang ...................... H02J 9/062
363/17
9,923,486 B2 * 3/2018 Nishimoto ........ H02M 7/53862
(Continued)

FOREIGN PATENT DOCUMENTS

JP   9-098567    4/1997
JP   2006-074954 3/2006
(Continued)

*Primary Examiner* — Adolf Berhane
(74) *Attorney, Agent, or Firm* — McDermott Will & Emery LLP

(57) ABSTRACT

An electric power conversion circuit includes: a first leg including first and third switches; a second leg including second and fourth switches; a third leg including fifth and seventh switches; a fourth leg including sixth and eighth switches; a first reactor connected between a first node, in which the first and second legs are connected to each other, and a fifth node, in which the third and fourth legs are connected to each other; a second reactor connected between a second node to which the first and second legs are connected and a sixth node to which the third and fourth legs are connected; a first port terminal connected to the first node; a second port terminal connected to the sixth node; a third port terminal connected to a midpoint of each of the first and third legs; and a fourth port terminal connected to a midpoint of each of the second and fourth legs.

13 Claims, 15 Drawing Sheets

(51) Int. Cl.
*H02M 7/12* (2006.01)
*H02M 3/158* (2006.01)

(58) Field of Classification Search
CPC ............ H02M 3/33523; H02M 3/325; H02M 3/3155; H02M 7/5387; H02M 7/521; H02M 7/53871; H02M 7/53862
USPC ..... 363/15, 16, 17, 55, 56.01, 56.02, 95, 98, 363/131, 132
See application file for complete search history.

(56) References Cited

U.S. PATENT DOCUMENTS

| | | | | |
|---|---|---|---|---|
| 2008/0290845 | A1* | 11/2008 | Holveck | H02M 5/271 |
| | | | | 323/214 |
| 2011/0292696 | A1* | 12/2011 | Xiao | H02M 1/32 |
| | | | | 363/37 |
| 2012/0173035 | A1 | 7/2012 | Abe | |
| 2012/0185708 | A1 | 7/2012 | Rekimoto et al. | |
| 2016/0013753 | A1* | 1/2016 | Tam | H03B 5/04 |
| | | | | 331/111 |
| 2017/0117913 | A1* | 4/2017 | Yamamoto | H03M 1/0617 |
| 2017/0163281 | A1* | 6/2017 | Hara | H03K 17/6871 |
| 2017/0346415 | A1* | 11/2017 | Nishimoto | H02M 7/5387 |
| 2018/0048240 | A1* | 2/2018 | Hayasaki | H02M 3/33584 |

FOREIGN PATENT DOCUMENTS

| | | |
|---|---|---|
| JP | 2011-091954 | 5/2011 |
| JP | 2012-010530 | 1/2012 |
| JP | 2013-099188 | 5/2013 |
| JP | 2013-138612 | 7/2013 |
| JP | 2013-150369 | 8/2013 |

* cited by examiner

ELECTRIC POWER CONVERSION CIRCUIT INCLUDING SWITCHES AND REACTORS, AND ELECTRIC POWER CONVERSION DEVICE INCLUDING ELECTRIC POWER CONVERSION CIRCUIT AND CONTROL CIRCUIT

BACKGROUND

1. Technical Field

The present disclosure relates to an electric power conversion circuit that converts DC power into AC power, converts AC power into DC power, or converts AC power of one frequency into AC power of another frequency. The present disclosure also relates to an electric power sending apparatus including such an electric power conversion circuit, a power receiving apparatus including such an electric power conversion circuit, and an electric power transmission system including such an electric power sending apparatus and such an electric power receiving apparatus.

2. Description of the Related Art

In recent years, the introduction of renewable energy power sources typified by photovoltaic power generation, wind power generation, biofuel power generation, and the like has been accelerated in addition to conventional power supplies such as thermal power generation, hydraulic power generation, and nuclear power generation that are provided by electric power companies. Further, apart from the existing large-scale commercial power networks, there has been a worldwide spread of the introduction of local small-scale power networks that lose less of electric power transmitted for great distances and achieve the local consumption of locally generated electric power.

Renewable energy power sources that are connected to such local small-scale power networks are often poorer in power generation capacity than major power sources of the conventional large-scale commercial power networks and fluctuate greatly in power generation capacity. Therefore, for stable and efficient operation of small-scale power networks, it is necessary to be able to transmit and receive electric power with high utilization efficiency and easily adjust the amount of electric power that is transmitted.

For example, Japanese Patent No. 5612718, Japanese Patent No. 5612920, and Japanese Unexamined Patent Application Publication No. 2011-091954 each disclose a conventional electric power transmission system.

SUMMARY

In one general aspect, the techniques disclosed here feature an electric power conversion circuit including: a first leg including a first switch and a third switch, the first and third switches being connected in series to each other; a second leg including a second switch and a fourth switch, the second leg being connected in parallel to the first leg, the second and fourth switches being connected in series to each other; a third leg including a fifth switch and a seventh switch, the fifth and seventh switches being connected in series to each other; a fourth leg including a sixth switch and an eighth switch, the fourth leg being connected in parallel to the third leg, the sixth and eighth switches being connected in series to each other; a first reactor connected between a first node, in which the first and second legs are connected to each other, and a fifth node, in which the third and fourth legs are connected to each other; a second reactor connected between a second node, in which the first and second legs are connected to each other, and a sixth node, in which the third and fourth legs are connected to each other; a first port terminal connected to the first node; a second port terminal connected to the sixth node; a third port terminal connected to a third node between the first and third switches and to a seventh node between the fifth and seventh switches; and a fourth port terminal connected to a fourth node between the second and fourth switches and to an eighth node between the sixth and eighth switches.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
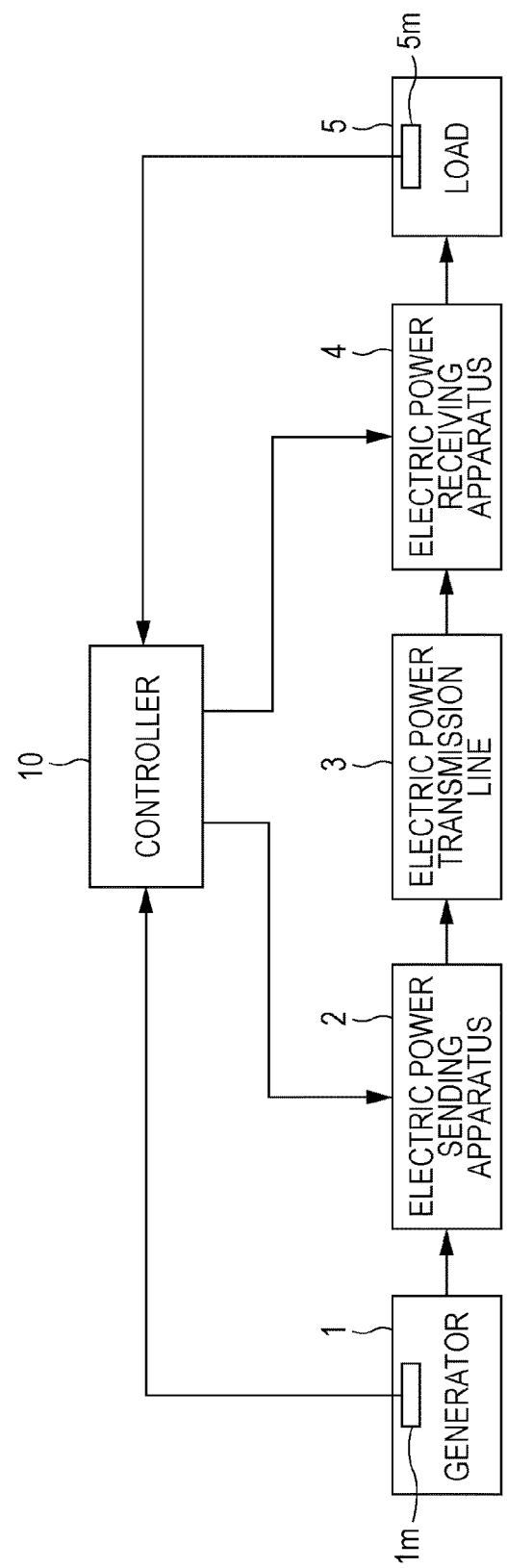
FIG. 1 is a block diagram showing an example configuration of an electric power transmission system according to an embodiment.

Underlying Knowledge Forming Basis of the Present Disclosure

First, the underlying knowledge that the inventor used to form the basis of the present disclosure is described.

According to Japanese Patent No. 5612718 and Japanese Patent No. 5612920, a conventional electric power network system basically needs to include electric power transmission lines (cooperative electric lines) for each separate pair of electric power systems that interchange electric power, inviting increases in material cost and construction cost of electric power transmission lines. These patent documents also describe examples in which the numbers of electric power transmission lines are reduced by the configurations of cooperative apparatuses; however, in either case, a large number of electric power transmission lines are needed. Further, according to these patent documents, each of the cooperative apparatuses needs to include a pair of electric power converters for each pair of electric power systems that interchange electric power. This undesirably invites increases in cost due to increases in scale of the cooperative apparatuses in addition to the increases in cost of electric power transmission lines.

Further, Japanese Unexamined Patent Application Publication No. 2011-091954 has the advantage that it is possible to interchange electric power in a time-division manner between a plurality of electric power sending apparatuses and a plurality of electric power receiving apparatuses and there is need for only a small number of electric power transmission lines. However, the time-division transmission of electric power makes it impossible to interchange electric power between plural pairs of electric power systems at the same time. That is, upon electric power request of a load, the electric power requested cannot be transmitted immediately. Furthermore, in a case where a large number of electric power interchanges are performed, largely-pulsed electric power is transmitted to the electric power transmission lines, as only a short time is allocated for each electric power interchange. This requires the electric power transmission lines to have power durability, leading to increases in cost. Further, the electric power receiving apparatuses are required to have high-power buffer functions, as there are time periods during which electric power cannot be received. Furthermore, achieving time-division electric power interchanges requires temporal synchronization between the plurality of electric power sending apparatuses and the plurality of electric power receiving apparatuses, and achieving this requires a very high degree of machine-to-machine control. This leads to increases in cost of the system as a whole.

As mentioned above, the inventions of Japanese Patent No. 5612718 and Japanese Patent No. 5612920 both use electric power transmission lines for each separate pair of electric power systems that send and receive electric power, thus requiring a large number of electric power transmission lines. Furthermore, the cooperative apparatuses both need a pair of electric power converters for each pair of electric power systems that send and receive electric power, and therefore, the cooperative apparatuses cannot be smaller in scale. This makes it difficult to interchange electric power among a large number of electric power systems. Meanwhile, the invention of Japanese Unexamined Patent Application Publication No. 2011-091954 cannot make it possible to perform a plurality of electric power transmissions at the same time, although it can reduce the number of electric power transmission lines by performing a plurality of electric power transmissions in a time-division manner on one electric power transmission line. Therefore, there has been a demand for an electric power transmission system that achieves a reduction in the number of electric power transmission lines while achieving reductions in size and thickness of electric power sending apparatuses and electric power receiving apparatuses. Further, there is also a demand for an electric power transmission system that more surely interchanges electric power from a plurality of electric power sending apparatuses to a plurality of electric power receiving apparatuses at the same time and can lower and raise the voltage of electric power.

Through the foregoing findings and discussions, the inventors have conceived of the following aspects of the present disclosure.

An embodiment of the present disclosure is described below with reference to the drawings. It should be noted that, throughout the following embodiment, the same constituent components are given the same reference numerals.

Embodiment

FIG. 1 is a block diagram showing a configuration of an electric power transmission system according to an embodiment. As shown in FIG. 1, the electric power transmission system includes a generator 1, an electric power sending apparatus 2, an electric power transmission line 3, an electric power receiving apparatus 4, a load 5, and a controller 10.

The electric power sending apparatus 2 is connected to the generator 1 and the electric power transmission line 3, converts the frequency of electric power inputted from the generator 1, and outputs the electric power to the electric power transmission line 3. The electric power receiving apparatus 4 is connected to the electric power transmission line 3 and the load 5, converts the frequency of electric power inputted from the electric power transmission line 3, and outputs the electric power to the load 5.

In the electric power transmission system shown in FIG. 1, DC power generated by the generator 1 is code-modulated by the electric power sending apparatus 2 using a code sequence of AC modulation codes, and the resulting code-modulated wave is transmitted to the electric power transmission line 3. The electric power transmission line 3 is for example a wired transmission line. The code-modulated wave transmitted via the electric power transmission line 3 is code-demodulated into DC power by the electric power receiving apparatus 4 using a code sequence of AC demodulation codes, and the resulting DC power is supplied to the load 5. It should be noted that although the present embodiment is described with reference to the generated current and the demodulated current, the present disclosure is not limited to this and the generated current and the demodulated current may be replaced by a generated voltage and a demodulated voltage, respectively.

The controller 10 sends control signals to the electric power sending apparatus 2 and the electric power receiving apparatus 4. The control signals each contains a system synchronization signal, a code sequence of modulation codes or demodulation codes, and the starting time and finishing time of electric power transmission (i.e. modulation or demodulation). The system synchronization signal is used for temporally synchronizing the electric power sending apparatus 2 and the electric power receiving apparatus 4 with each other.

The controller 10 may send the code sequence of modulation codes and the code sequence of demodulation codes to the electric power sending apparatus 2 and the electric power receiving apparatus 4, respectively. Alternatively, instead of sending the code sequences per se, the controller 10 may send, to the electric power sending apparatus 2 and the electric power receiving apparatus 4, original data on the basis of which code sequences are generated, and the electric power sending apparatus 2 and the electric power receiving apparatus 4 may generate a code sequence of modulation codes and a code sequence of demodulation codes, respectively, on the basis of the original data. Alternatively, the code sequence of modulation codes and the code sequence of demodulation codes may be configured in advance in the electric power sending apparatus 2 and the electric power receiving apparatus 4, respectively.

In a case where the electric power transmission system includes a plurality of the generators 1, a plurality of the electric power sending apparatuses 2, a plurality of the loads 5, and a plurality of the electric power receiving apparatuses 4, a combination of an electric power sending apparatus 2 and an electric power receiving apparatus 4 that transmits electric power can be designated by code sequences (or their original data) that are sent from the controller 10 to the electric power sending apparatus 2 and the electric power receiving apparatus 4. The controller 10 sends the code sequence of modulation codes to the electric power sending apparatus 2 supposed to send the electric power and sends the code sequence of demodulation codes to the electric power receiving apparatus 4 supposed to receive the electric power. This allows the electric power to be sent from the generator 1 connected to the designated electric power sending apparatus 2 to the load 5 connected to the designated electric power receiving apparatus 4.

The generator 1 includes a power meter 1m. The power meter 1m measures the amount of electricity generated by the generator 1, i.e. the amount of DC power from the generator 1 to the electric power sending apparatus 2, and sends the amount of electric power to the controller 10. The load 5 includes a power meter 5m. The power meter 5m measures the amount of electric power that is used by the load 5, i.e. the amount of DC power from the electric power receiving apparatus 4 to the load 5, and sends the amount of electric power to the controller 10. The controller 10 controls the operation of the electric power sending apparatus 2 and the electric power receiving apparatus 4 on the basis of the amounts of electric power thus received, respectively. For example, in a case where the amount of electricity generated by the generator 1 is smaller than the amount of electric power that is used by the load 5, the controller 10 may stop the electric power transmission. Further, in a case where there are a plurality of the generators 1 and there is a generator 1 that generates an amount of electricity that is larger than the amount of electric power that is used by the load 5, the controller 10 may cause the electric power sending apparatus 2 connected to that generator 1 to send electric power.

It should be noted that the power meter 1m may replace the generator 1 as a stage preceding the electric power sending apparatus 2. Further, the power meter 5m may replace the load 5 as a stage following the electric power receiving apparatus 4.

It should be noted that the generator 1 may be another power source including an electricity storing device such as a battery or a capacitor. The load 5 may be another electric installation including an electricity storing device such as a battery or a capacitor. Incorporation of an electricity storing device into the electric power transmission system of the present embodiment makes it possible to make effective use of electric power generated in time periods during which less or no electric power is consumed, making it possible to bring about improvement in overall power efficiency.

Figure 2:
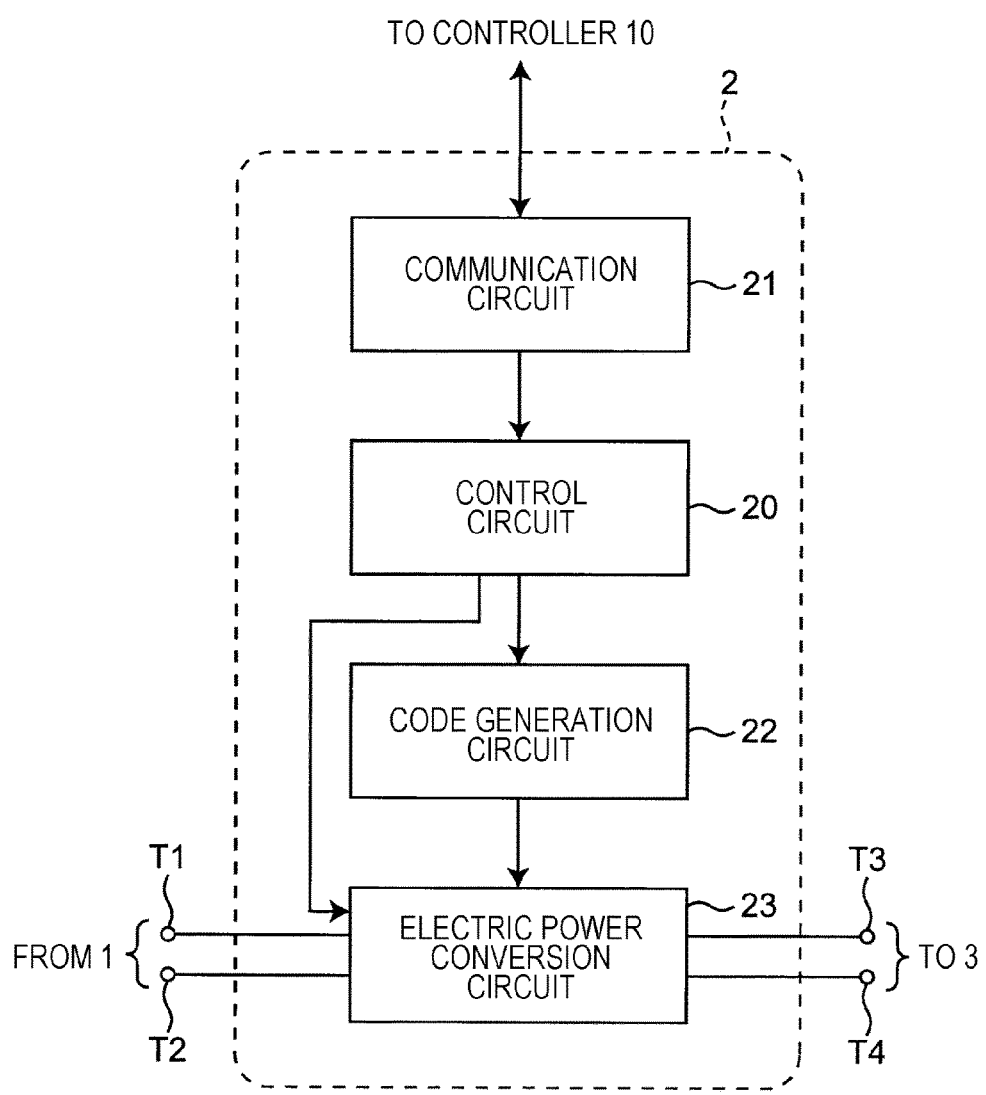
FIG. 2 is a block diagram showing an example configuration of an electric power sending apparatus according to the embodiment.

FIG. 2 is a block diagram showing a configuration of the electric power sending apparatus 2 shown in FIG. 1. As shown in FIG. 2, the electric power sending apparatus 2 includes a control circuit 20, a communication circuit 21, a code generation circuit 22, and an electric power conversion circuit 23.

As shown in FIG. 2, the electric power sending apparatus 2 includes port terminals T1 and T2 connected to the generator 1 and port terminals T3 and T4 connected to the electric power transmission line 3.

The communication circuit 21 receives a control signal from the controller 10 and sends it to the control circuit 20. The control signal contains a system synchronization signal, a code sequence of modulation codes (or its original data), and the starting time and finishing time of electric power transmission. The communication circuit 21 may be a wireless communication circuit or a wired communication circuit. In accordance with the control signal sent from the controller 10, the control circuit 20 causes the code generation circuit 22 to generate a code sequence of modulation codes and output it to the electric power conversion circuit 23 and controls the start and end of operation of the electric power conversion circuit 23. The electric power conversion circuit 23 modulates electric power inputted from the generator 1 via the port terminals T1 and T2 and outputs the electric power thus modulated to the electric power transmission line 3 via the port terminals T3 and T4.

Figure 3:
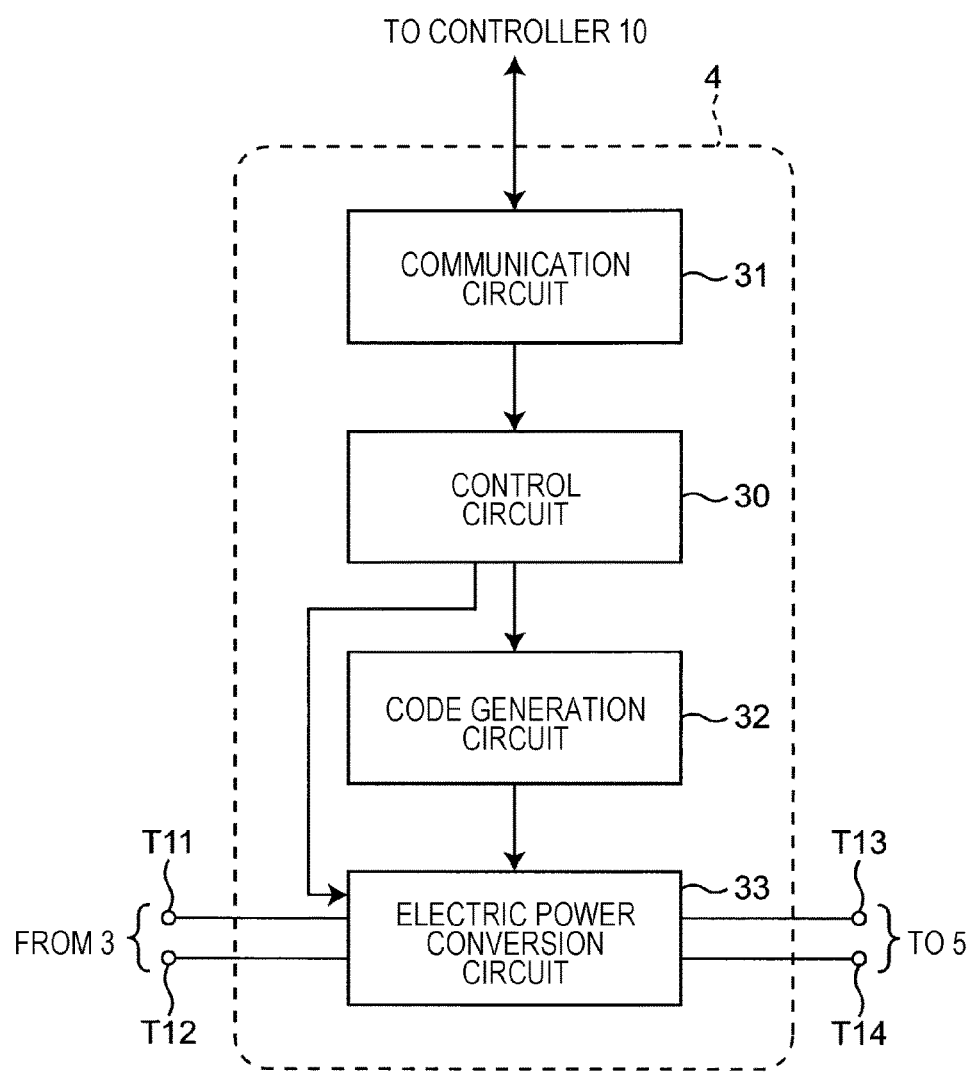
FIG. 3 is a block diagram showing an example configuration of an electric power receiving apparatus according to the embodiment.

FIG. 3 is a block diagram showing a configuration of the electric power receiving apparatus 4 shown in FIG. 1. As shown in FIG. 3, the electric power receiving apparatus 4 includes a control circuit 30, a communication circuit 31, a code generation circuit 32, and an electric power conversion circuit 33.

As shown in FIG. 3, the electric power receiving apparatus 4 includes port terminals T11 and T12 connected to the electric power transmission line 3 and port terminals T13 and T14 connected to the load 5.

The communication circuit 31 receives a control signal from the controller 10 and sends it to the control circuit 30. The control signal contains a system synchronization signal, a code sequence of demodulation codes (or its original data), and the starting time and finishing time of electric power transmission. The communication circuit 31 may be a wireless communication circuit or a wired communication circuit. In accordance with the control signal sent from the controller 10, the control circuit 30 causes the code generation circuit 32 to generate a code sequence of demodulation codes and output it to the electric power conversion circuit 33 and controls the start and end of operation of the electric power conversion circuit 33. The electric power conversion circuit 33 demodulates electric power inputted from the electric power transmission line 3 via the port terminals T11 and T12 and outputs the electric power thus demodulated to the load 5 via the port terminals T13 and T14.

It should be noted that, in the electric power transmission system shown in FIG. 1, the control signals from the controller 10 to the electric power sending apparatus 2 and the electric power receiving apparatus 4 may be transmitted either wirelessly or through control signal lines that are different from the electric power transmission line 3. Further, the control signals may be multiplexed onto code-modulated waves under a predetermined multiplexing scheme and transmitted through the electric power transmission line 3. In the latter case, a reduction in cost can be achieved by eliminating the communication circuits 21 and 31, which are used in communications from the controller 10 to the electric power sending apparatus 2 and the electric power receiving apparatus 4.

Figure 4:
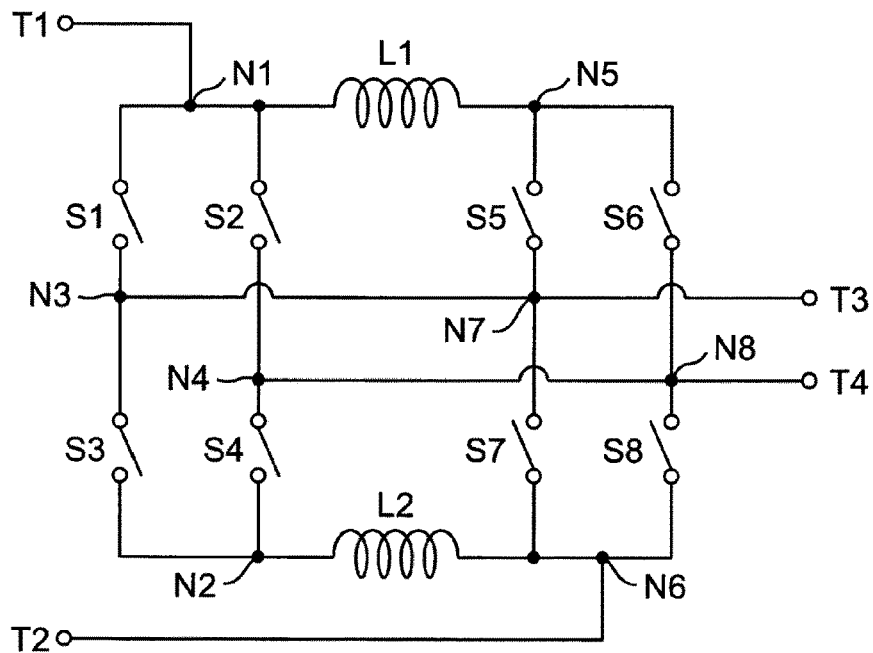
FIG. 4 is a circuit diagram showing an example configuration of an electric power conversion circuit according to the embodiment.

FIG. 4 is a circuit diagram showing a configuration of the electric power conversion circuit 23 shown in FIG. 2. As shown in FIG. 4, the electric power conversion circuit 23 includes the port terminals T1 to T4, switches S1 to S8, and reactors L1 and L2.

The port terminals T1 and T2 are also referred to as "first and second port terminals", and the port terminals T3 and T4 are also referred to as "third and fourth port terminals". Either the pair of port terminals T1 and T2 or the pair of port terminals T3 and T4 serves as an input port of electric power, and the other of the pairs serves as an output port of electric power. The switches S1 to S8 are also referred to as "first to eighth switches". The reactors L1 and L2 are also referred to as "first and second reactors".

The switches S1 to S4 constitute a first full-bridge circuit. The first full-bridge circuit includes a first node N1 between the switches S1 and S2, a second node N2 between the switches S3 and S4, a third node N3 between the switches S1 and S3, and a fourth node N4 between the switches S2 and S4.

The switches S5 to S8 constitute a second full-bridge circuit. The second full-bridge circuit includes a fifth node N5 between the switches S5 and S6, a sixth node N6 between the switches S7 and S8, a seventh node N7 between the switches S5 and S7, and an eighth node N8 between the switches S6 and S8.

The switches S1 and S3 are connected in series to each other to constitute a first leg. The switches S2 and S4 are connected in series to each other to constitute a second leg. The switches S5 and S7 are connected in series to each other to constitute a third leg. The switches S6 and S8 are connected in series to each other to constitute a fourth leg. The first leg and the second leg are connected in parallel to each other, and the third leg and the fourth leg are connected in parallel to each other.

The node N1 and N5 are connected to each other via the reactor L1, and the node N2 and N6 are connected to each other via the reactor L2. The node N1 is connected to the port terminal T1, and the node N6 is connected to the port terminal T2. The nodes N3 and N7 are connected to the port terminal T3, and the node N4 and N8 are connected to the port terminal T4.

Figure 5:
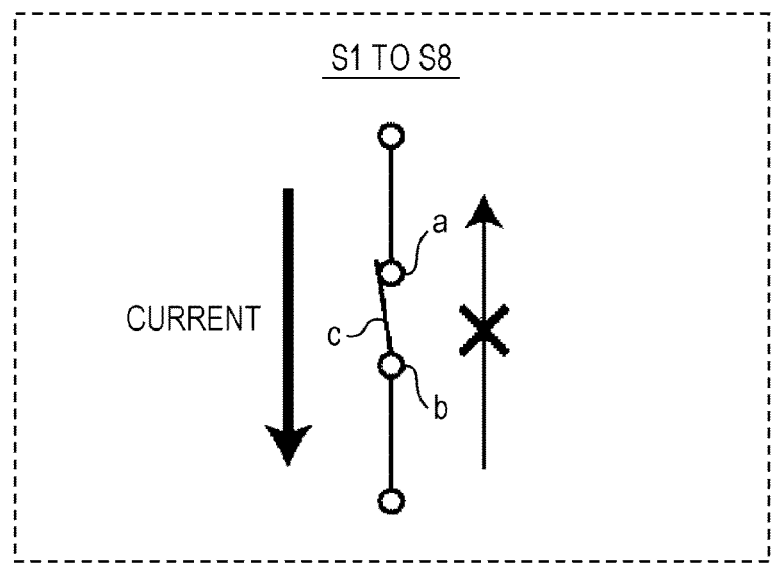
FIG. 5 is a diagram for explaining an example of the direction of current flowing through a switch according to the embodiment.

The switches S1 to S8 operate under the control of the control circuit 20 and the code generation circuit 22, which are shown in FIG. 2. Each of the switches S1 to S8 is a semiconductor switch that, when turned on, allows current to flow only in one direction. FIG. 5 is a diagram for explaining the direction of current flowing through each of the switches S1 to S8 shown in FIG. 4. The switch shown in FIG. 5 includes imaginary terminals a and b and an imaginary moving contact c. The moving contact c is opened and closed with respect to the terminal a and is always connected to the terminal b. According to this notation, the switch shown in FIG. 5, when turned on, allows current to flow only in a direction from the terminal a toward the terminal b. As with the switch shown in FIG. 5, each of the switches S1 to S8 shown in FIG. 4, when turned on, allows current to flow only in one direction.

The control circuit 20 and the code generation circuit 22 constitute a circuit that serves as an example of the "control circuit" recited in the claims. This control circuit may be constituted, for example, by a control IC and a gate driver. The control IC is for example a microcomputer. The gate driver applies a gate signal to the gate of each of the switches S1 to S8, for example, in accordance with an instruction from the control IC. The control IC may include, for example, a memory and a processor. The memory may store a program for causing the electric power conversion circuit 23 to operate in a plurality of modes. By executing this program, the processor may cause the electric power conversion circuit 23 to operate.

Figure 6:
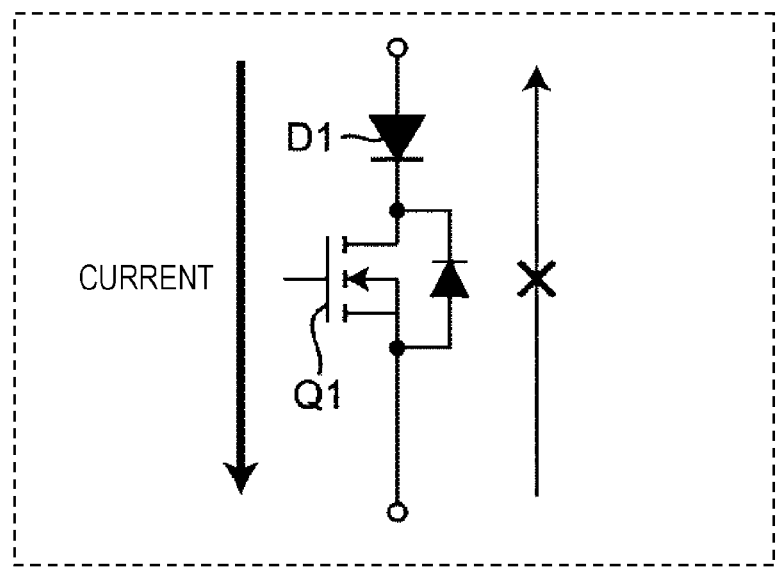
FIG. 6 is a diagram showing a first example of a switch according to the embodiment.
Figure 7:
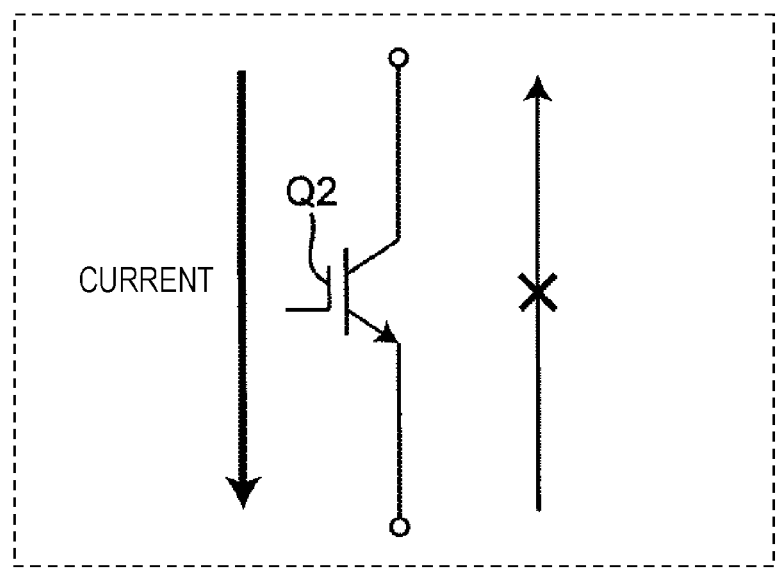
FIG. 7 is a diagram showing a second example of a switch according to the embodiment.

FIG. 6 is a diagram showing a first example of each of the switches S1 to S8 shown in FIG. 4. FIG. 7 is a diagram showing a second example of each of the switches S1 to S8 shown in FIG. 4. As shown in FIG. 6, each of the switches S1 to S8 may be a combination of a switch Q1 and a diode D1. The switch Q1 is a MOSFET, and the diode D1 serves to prevent backflow. Alternatively, as shown in FIG. 7, each of the switches S1 to S8 may be a switch Q2 that is an IGBT that allows current to flow only in one direction.

The switch S1 is configured to, when turned on, allow current to flow only from the node N3 toward the node N1. The switch S2 is configured to, when turned on, allow current to flow only from the node N4 toward the node N1. The switch S3 is configured to, when turned on, allow current to flow only from the node N2 toward the node N3. The switch S4 is configured to, when turned on, allow current to flow only from the node N2 toward the node N4. The switch S5 is configured to, when turned on, allow current to flow only from the node N5 toward the node N7. The switch S6 is configured to, when turned on, allow current to flow only from the node N5 toward the node N8. The switch S7 is configured to, when turned on, allow current to flow only from the node N7 toward the node N6. The switch S8 is configured to, when turned on, allow current to flow only from the node N8 toward the node N6.

The electric power conversion circuit 33 shown in FIG. 3 is similar in configuration to the electric power conversion circuit 23 shown in FIG. 4.

As will be described below, the electric power conversion circuit 23 shown in FIG. 4 is able to lower the voltage of electric power inputted thereto and output the electric power (step-down mode) and is further able to raise the voltage of electric power inputted thereto and output the electric power (step-up mode). These operations are described with reference to FIGS. 8 to 23.

The following description assumes that a power source 1A is connected to the port terminals T1 and T2 of the electric power conversion circuit 23 shown in FIG. 4 and a load 5A is connected to the port terminals T3 and T4. That is, the pair of port terminals T1 and T2 serves as an input port, and the pair of port terminals T3 and T4 serves as an output port. The electric power conversion circuit 23 converts electric power inputted via the port terminals T1 and T2 and outputs the electric power via the port terminals T3 and T4.

Further, the following description specifies that a positive voltage is applied to the port terminals T1 and T2 when the potential of the port terminal T1 is higher than the potential of the port terminal T2 and a negative voltage is applied to the port terminals T1 and T2 when the potential of the port terminal T2 is higher than the potential of the port terminal T1. Similarly, the following description specifies that a positive voltage is outputted from the port terminals T3 and T4 when the potential of the port terminal T3 is higher than the potential of the port terminal T4 and a negative voltage is outputted from the port terminals T3 and T4 when the potential of the port terminal T4 is higher than the potential of the port terminal T3.

First, the step-down mode operation of the electric power conversion circuit 23 shown in FIG. 4 is described with reference to FIGS. 8 to 15.

When the electric power conversion circuit 23 operates in the step-down mode, the switches S1 to S8 are controlled to alternately switch between the following two states:
(1) State in which current returns from the input port (AC power source 1A) via the reactor L1 or L2 and the output port (load 5A) to the input port; and
(2) State in which current returns from the reactor L1 or L2 via the output port to the reactor L1 or L2 without passing through the input port.

The state (1) is an example of the "charge state in which an input voltage applied to the input port is divided into a charge voltage for charging the first or second reactor and a charge voltage that is applied to the output port" of the present disclosure. The state (2) is an example of the "discharge state in which a discharge voltage from the first or second rector is applied to the output port" of the present disclosure.

Figure 8:
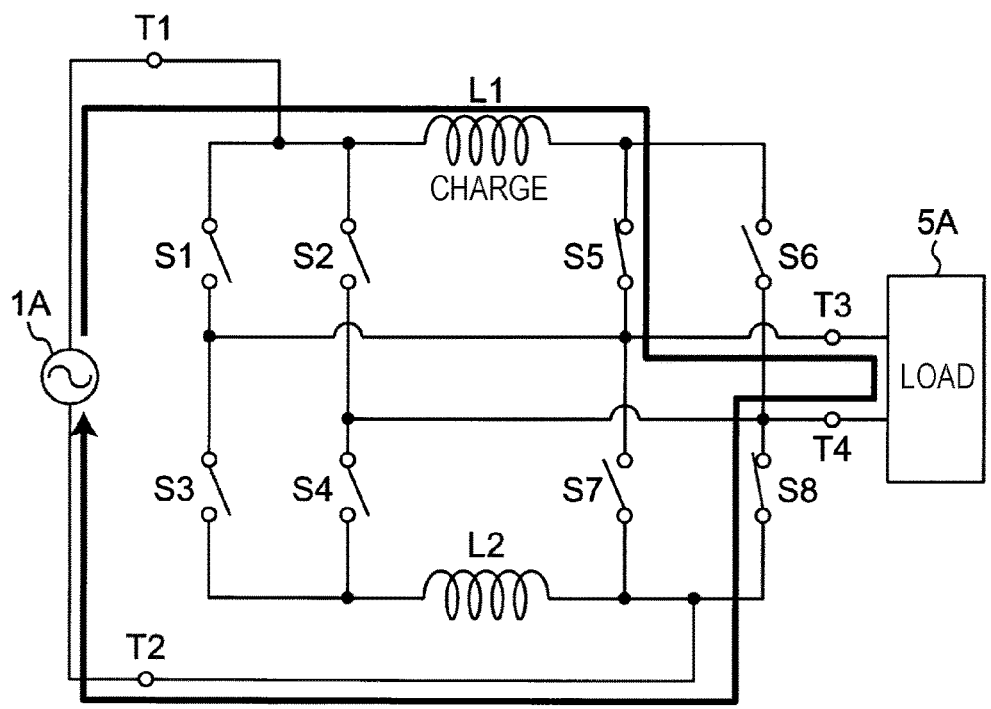
FIG. 8 is a diagram showing an example of a path of current flowing through the electric power conversion circuit according to the embodiment.
Figure 9:
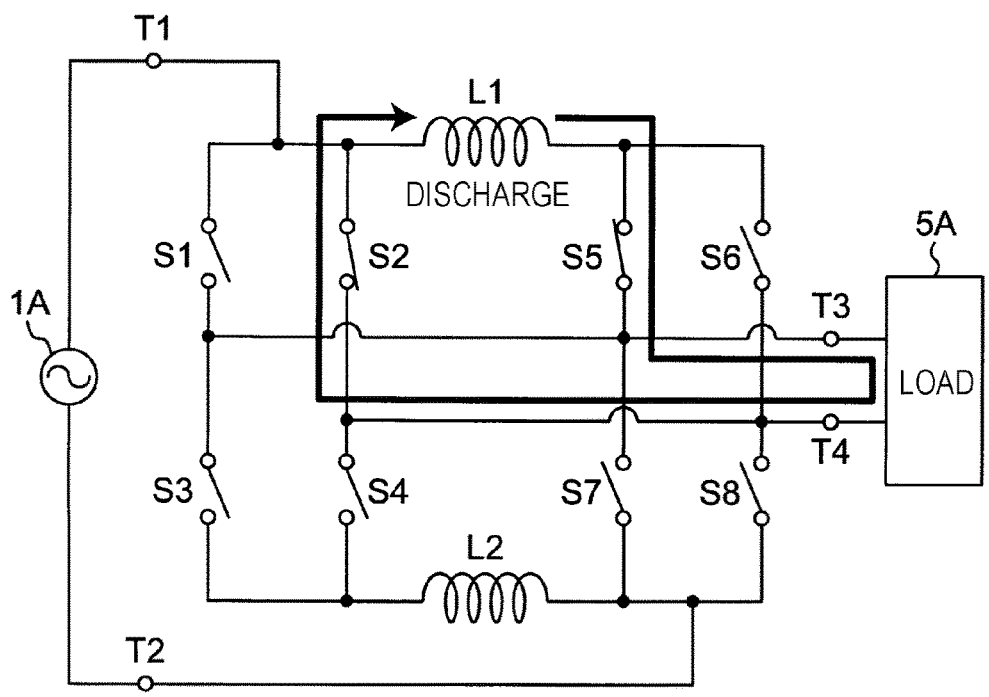
FIG. 9 is a diagram showing an example of a path of current flowing through the electric power conversion circuit according to the embodiment.

FIG. 8 is a diagram showing current flowing in a first period of time during which a positive voltage is applied to the port terminals T1 and T2 and a positive voltage is outputted from the port terminals T3 and T4 in a case where the electric power conversion circuit 23 shown in FIG. 4 operates in the step-down mode. FIG. 9 is a diagram showing current flowing in a second period of time during which a positive voltage is applied to the port terminals T1 and T2 and a positive voltage is outputted from the port terminals T3 and T4 in a case where the electric power conversion circuit 23 shown in FIG. 4 operates in the step-down mode. In this case, the following two switching states are alternately switched between at a time ratio corresponding to the ratio between the input voltage and the desired output voltage:
State 1: The switches S5 and S8 are turned on, and the switches S1 to S4, S6, and S7 are turned off (FIG. 8); and
State 2: The switches S2 and S5 are turned on, and the switches S1, S3, S4, and S6 to S8 are turned off (FIG. 9).

In State 1, the electric power conversion circuit 23 outputs, to the load 5A, the electric power inputted from the AC power source 1A and, at the same time, stores the electric power in the reactor L1. In State 2, the electric power conversion circuit 23 disconnects the AC power source 1A from the load 5A and causes the energy stored in the reactor L1 to be discharged as electric power and outputted to the load 5A. The desired voltage is outputted from the port terminals T3 and T4 by alternately switching between State 1 and State 2 at a time ratio corresponding to the ratio between the input voltage and the desired output voltage.

Figure 10:
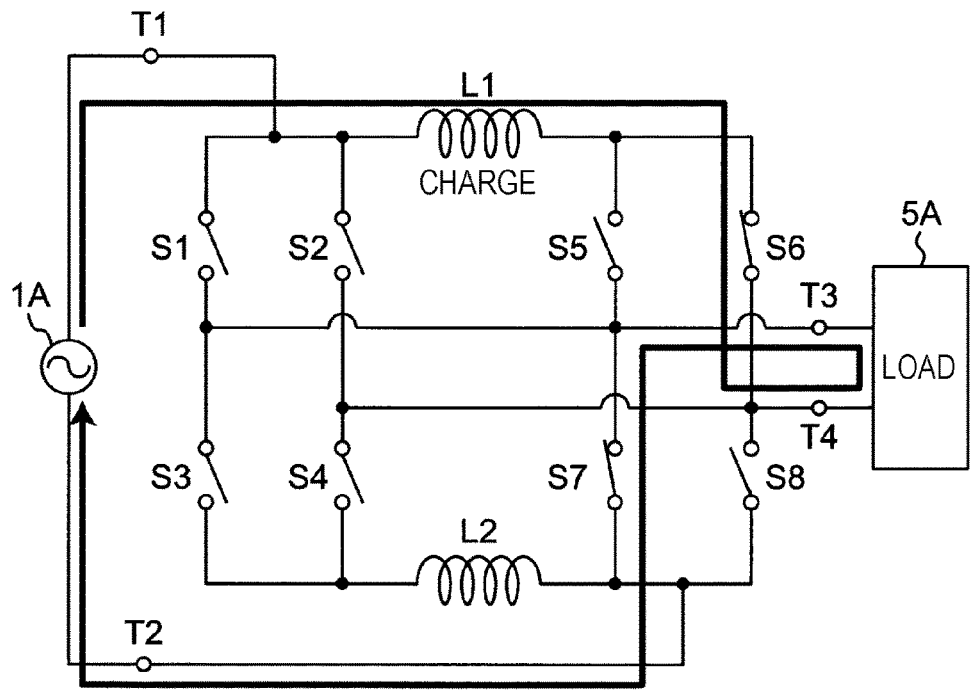
FIG. 10 is a diagram showing an example of a path of current flowing through the electric power conversion circuit according to the embodiment.
Figure 11:
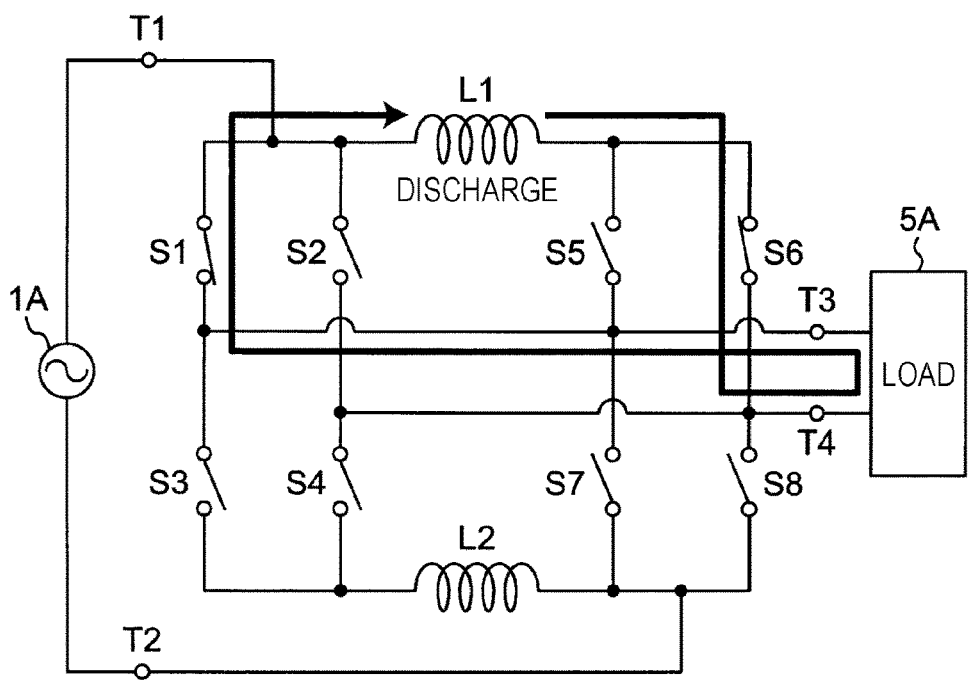
FIG. 11 is a diagram showing an example of a path of current flowing through the electric power conversion circuit according to the embodiment.

FIG. 10 is a diagram showing current flowing in a first period of time during which a positive voltage is applied to the port terminals T1 and T2 and a negative voltage is outputted from the port terminals T3 and T4 in a case where the electric power conversion circuit 23 shown in FIG. 4 operates in the step-down mode. FIG. 11 is a diagram showing current flowing in a second period of time during which a positive voltage is applied to the port terminals T1 and T2 and a negative voltage is outputted from the port terminals T3 and T4 in a case where the electric power conversion circuit 23 shown in FIG. 4 operates in the step-down mode. In this case, the following two switching states are alternately switched between at a time ratio corresponding to the ratio between the input voltage and the desired output voltage:
State 3: The switches S6 and S7 are turned on, and the switches S1 to S5 and S8 are turned off (FIG. 10); and
State 4: The switches S1 and S6 are turned on, and the switches S2 to S5, S7, and S8 are turned off (FIG. 11).

In State 3, the electric power conversion circuit 23 outputs, to the load 5A, the electric power inputted from the AC power source 1A and, at the same time, stores the electric power in the reactor L1. In State 4, the electric power conversion circuit 23 disconnects the AC power source 1A from the load 5A and causes the energy stored in the reactor L1 to be discharged as electric power and outputted to the load 5A. The desired voltage is outputted from the port terminals T3 and T4 by alternately switching between State 3 and State 4 at a time ratio corresponding to the ratio between the input voltage and the desired output voltage.

Figure 12:
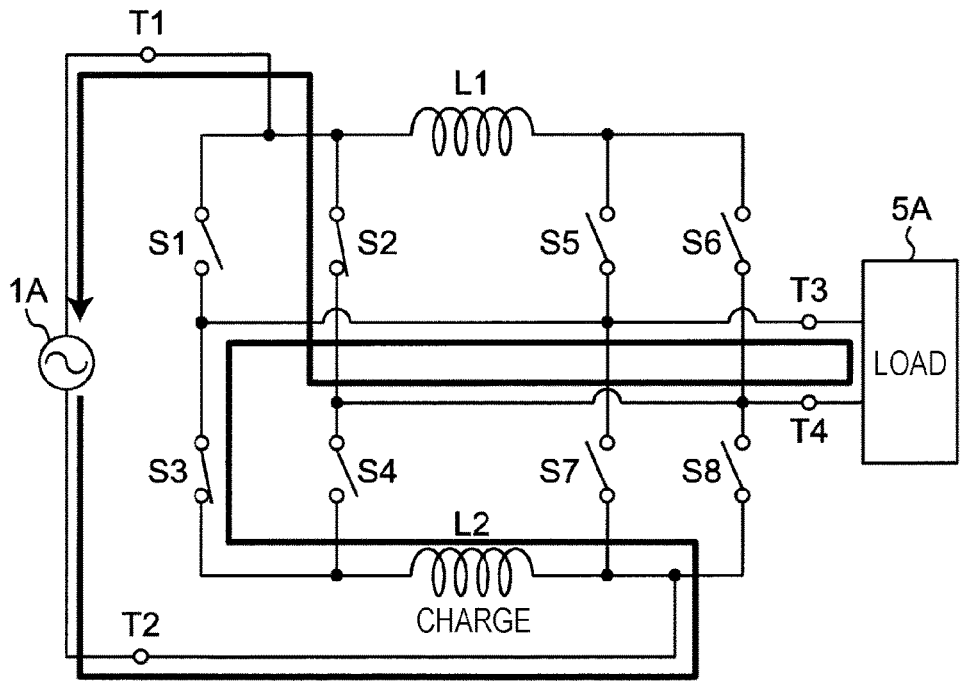
FIG. 12 is a diagram showing an example of a path of current flowing through the electric power conversion circuit according to the embodiment.
Figure 13:
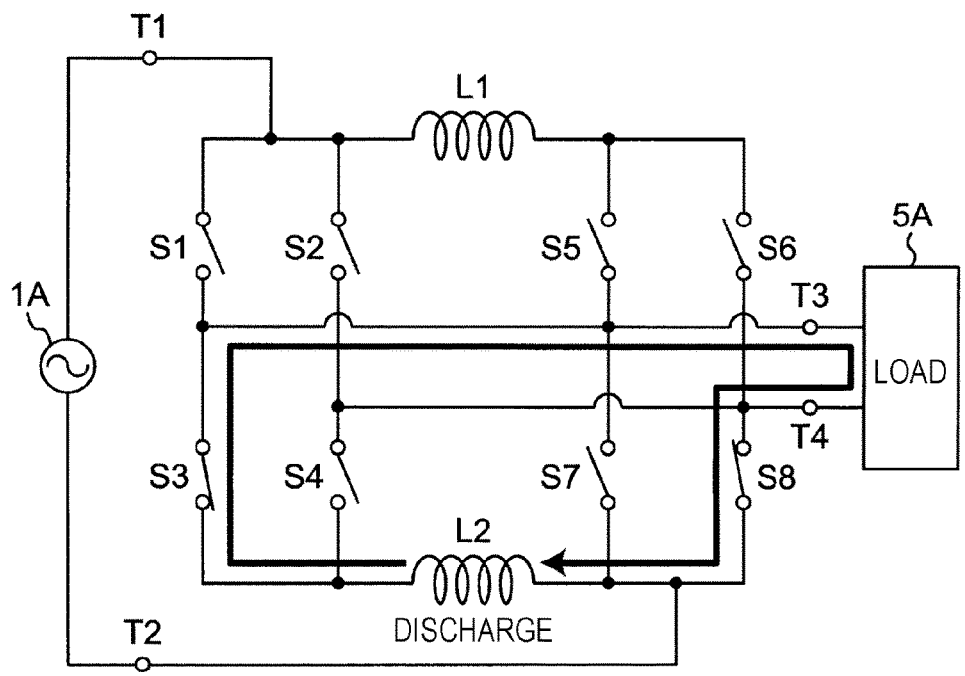
FIG. 13 is a diagram showing an example of a path of current flowing through the electric power conversion circuit according to the embodiment.

FIG. 12 is a diagram showing current flowing in a first period of time during which a negative voltage is applied to the port terminals T1 and T2 and a positive voltage is outputted from the port terminals T3 and T4 in a case where the electric power conversion circuit 23 shown in FIG. 4 operates in the step-down mode. FIG. 13 is a diagram showing current flowing in a second period of time during which a negative voltage is applied to the port terminals T1 and T2 and a positive voltage is outputted from the port terminals T3 and T4 in a case where the electric power conversion circuit 23 shown in FIG. 4 operates in the step-down mode. In this case, the following two switching states are alternately switched between at a time ratio corresponding to the ratio between the input voltage and the desired output voltage:
State 5: The switches S2 and S3 are turned on, and the switches S1 and S4 to S8 are turned off (FIG. 12); and
State 6: The switches S3 and S8 are turned on, and the switches S1, S2, and S4 to S7 are turned off (FIG. 13).

In State 5, the electric power conversion circuit 23 outputs, to the load 5A, the electric power inputted from the AC power source 1A and, at the same time, stores the electric power in the reactor L2. In State 6, the electric power conversion circuit 23 disconnects the AC power source 1A from the load 5A and causes the energy stored in the reactor L2 to be discharged as electric power and outputted to the load 5A. The desired voltage is outputted from the port terminals T3 and T4 by alternately switching between State 5 and State 6 at a time ratio corresponding to the ratio between the input voltage and the desired output voltage.

Figure 14:
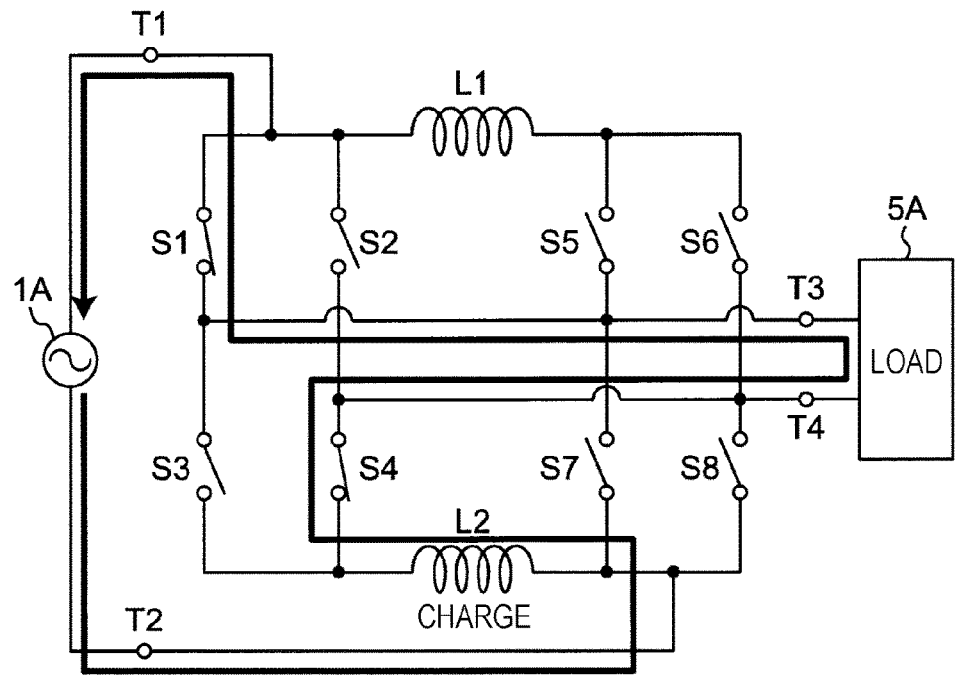
FIG. 14 is a diagram showing an example of a path of current flowing through the electric power conversion circuit according to the embodiment.
Figure 15:
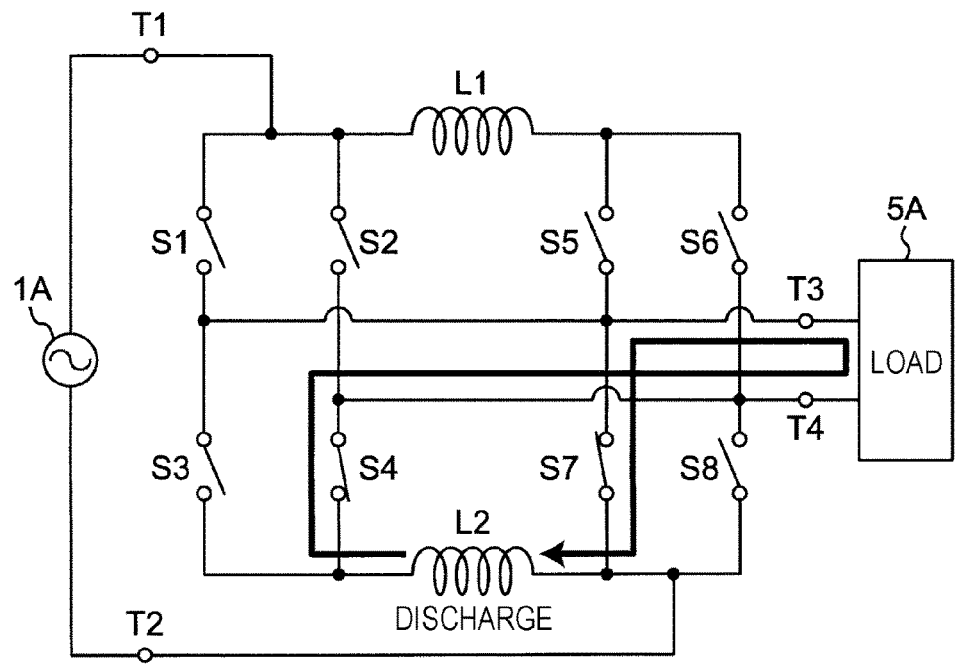
FIG. 15 is a diagram showing an example of a path of current flowing through the electric power conversion circuit according to the embodiment.

FIG. 14 is a diagram showing current flowing in a first period of time during which a negative voltage is applied to the port terminals T1 and T2 and a negative voltage is outputted from the port terminals T3 and T4 in a case where the electric power conversion circuit 23 shown in FIG. 4 operates in the step-down mode. FIG. 15 is a diagram showing current flowing in a second period of time during which a negative voltage is applied to the port terminals T1 and T2 and a negative voltage is outputted from the port terminals T3 and T4 in a case where the electric power conversion circuit 23 shown in FIG. 4 operates in the step-down mode. In this case, the following two switching states are alternately switched between at a time ratio corresponding to the ratio between the input voltage and the desired output voltage:

State 7: The switches S1 and S4 are turned on, and the switches S2, S3, and S5 to S8 are turned off (FIG. 14); and State 8: The switches S4 and S7 are turned on, and the switches S1 to S3, S5, S6, and S8 are turned off (FIG. 15).

In State 7, the electric power conversion circuit 23 outputs, to the load 5A, the electric power inputted from the AC power source 1A and, at the same time, stores the electric power in the reactor L2. In State 8, the electric power conversion circuit 23 disconnects the AC power source 1A from the load 5A and causes the energy stored in the reactor L2 to be discharged as electric power and outputted to the load 5A. The desired voltage is outputted from the port terminals T3 and T4 by alternately switching between State 7 and State 8 at a time ratio corresponding to the ratio between the input voltage and the desired output voltage.

States 1, 3, 5, and 7 are examples of the "first to fourth charge states" of the present disclosure, respectively. States 2, 4, 6, and 8 are examples of the "first to fourth discharge states" of the present disclosure, respectively.

Next, the step-up mode operation of the electric power conversion circuit 23 shown in FIG. 4 is described with reference to FIGS. 16 to 23.

When the electric power conversion circuit 23 operates in the step-up mode, the switches S1 to S8 are controlled to alternately switch between the following two states:
(3) State in which current returns from the input port (AC power source 1A) via the reactor L1 or L2 to the input port without passing through the output port (load 5A); and
(4) State in which current returns from the input port via the reactor L1 or L2 and the output port to the input port.

The state (3) is an example of the "charge state in which an input voltage applied to the input port is applied as a charge voltage to the first or second reactor" of the present disclosure. The state (4) is an example of the "discharge state in which a composite voltage of a discharge voltage from the first or second reactor and the input voltage from the input port is applied to the output port" of the present disclosure.

Figure 16:
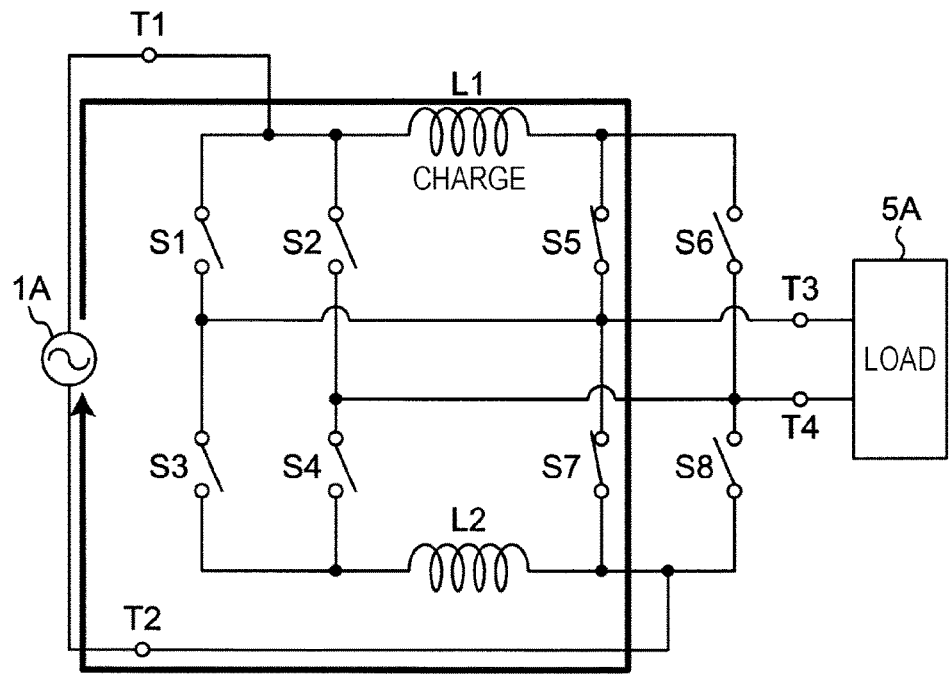
FIG. 16 is a diagram showing an example of a path of current flowing through the electric power conversion circuit according to the embodiment.
Figure 17:
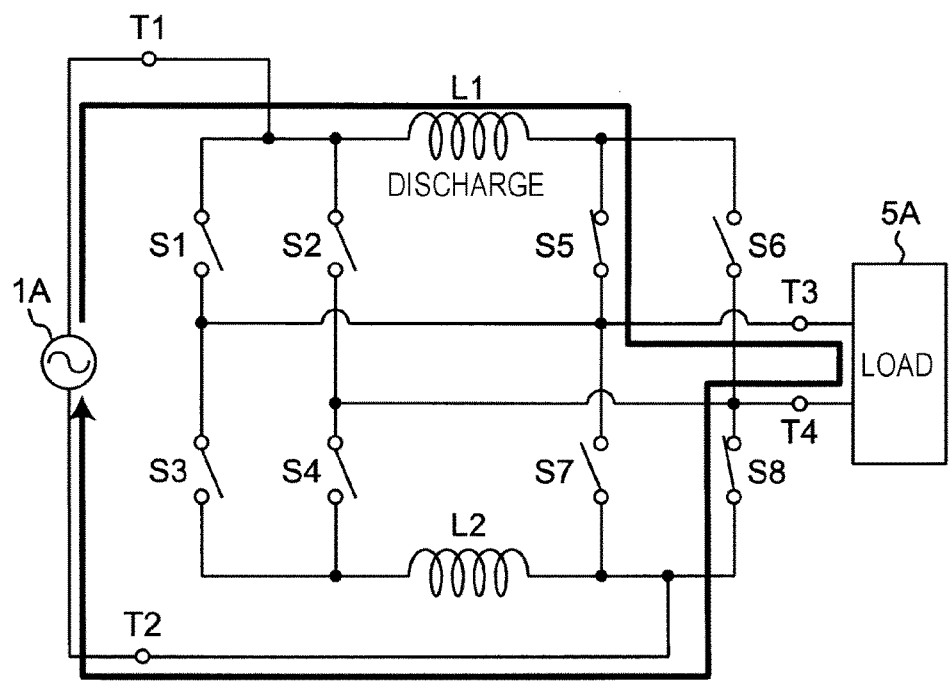
FIG. 17 is a diagram showing an example of a path of current flowing through the electric power conversion circuit according to the embodiment.

FIG. 16 is a diagram showing current flowing in a first period of time during which a positive voltage is applied to the port terminals T1 and T2 and a positive voltage is outputted from the port terminals T3 and T4 in a case where the electric power conversion circuit 23 shown in FIG. 4 operates in the step-up mode. FIG. 17 is a diagram showing current flowing in a second period of time during which a positive voltage is applied to the port terminals T1 and T2 and a positive voltage is outputted from the port terminals T3 and T4 in a case where the electric power conversion circuit 23 shown in FIG. 4 operates in the step-up mode. In this case, the following two switching states are alternately switched between at a time ratio corresponding to the ratio between the input voltage and the desired output voltage:

State 9: The switches S5 and S7 are turned on, and the switches S1 to S4, S6, and S8 are turned off (FIG. 16); and State 10: The switches S5 and S8 are turned on, and the switches S1 to S4, S6, and S7 are turned off (FIG. 17).

In State 9, the electric power conversion circuit 23 disconnects the load 5A from the AC power source 1A and stores, in the reactor L1, the energy of the electric power inputted from the AC power source 1A. In State 10, the electric power conversion circuit 23 superimposes, onto the electric power inputted from the AC power source 1A, the energy stored in the reactor L1 and outputs the resulting electric power to the load 5A. The desired voltage is outputted from the port terminals T3 and T4 by alternately switching between State 9 and State 10 at a time ratio corresponding to the ratio between the input voltage and the desired output voltage.

Figure 18:
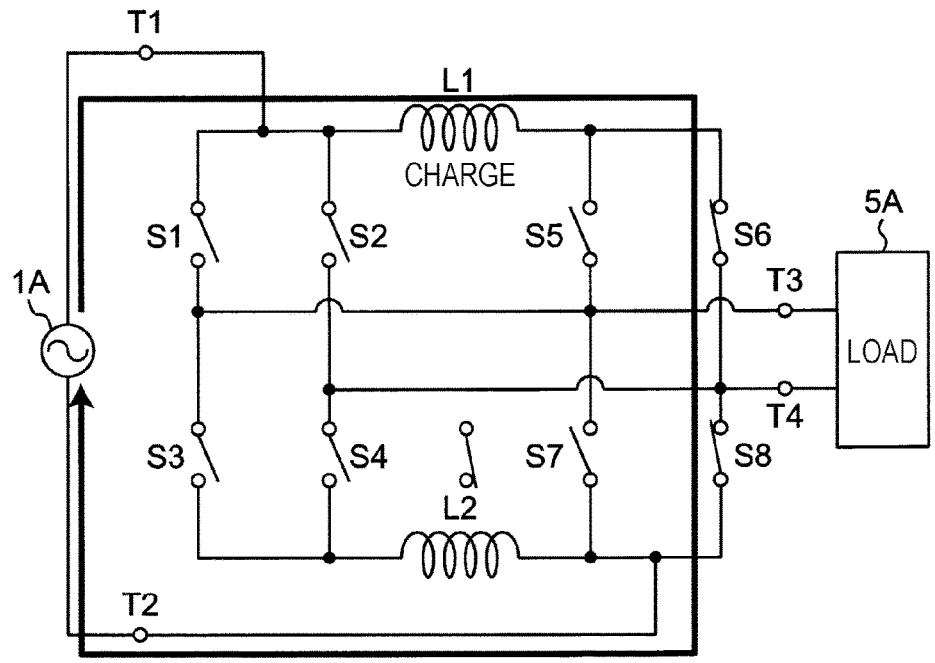
FIG. 18 is a diagram showing an example of a path of current flowing through the electric power conversion circuit according to the embodiment.
Figure 19:
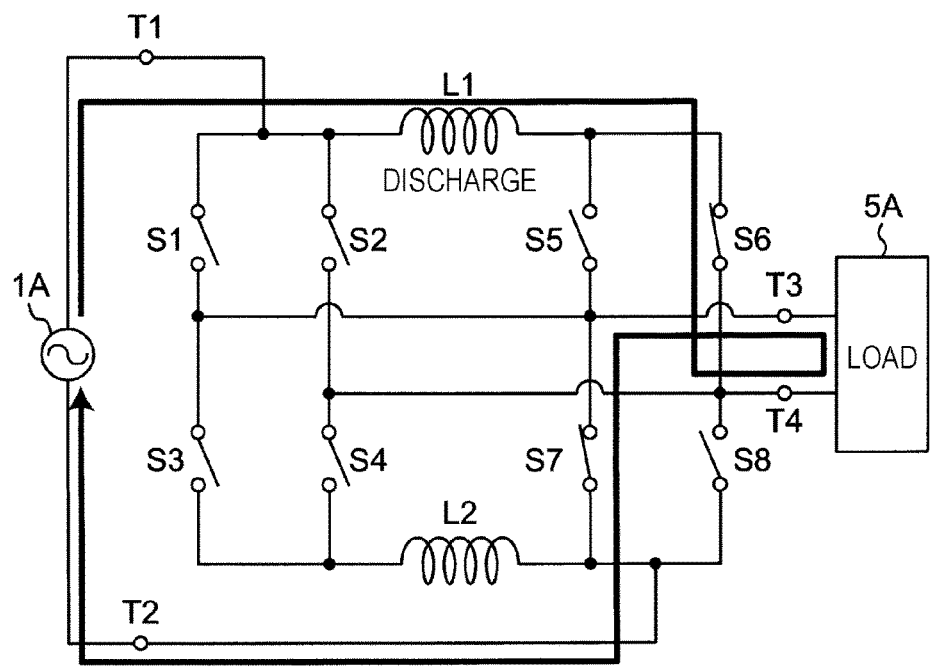
FIG. 19 is a diagram showing an example of a path of current flowing through the electric power conversion circuit according to the embodiment.

FIG. 18 is a diagram showing current flowing in a first period of time during which a positive voltage is applied to the port terminals T1 and T2 and a negative voltage is outputted from the port terminals T3 and T4 in a case where the electric power conversion circuit 23 shown in FIG. 4 operates in the step-up mode. FIG. 19 is a diagram showing current flowing in a second period of time during which a positive voltage is applied to the port terminals T1 and T2 and a negative voltage is outputted from the port terminals T3 and T4 in a case where the electric power conversion circuit 23 shown in FIG. 4 operates in the step-up mode. In this case, the following two switching states are alternately switched between at a time ratio corresponding to the ratio between the input voltage and the desired output voltage:

State 11: The switches S6 and S8 are turned on, and the switches S1 to S5 and S7 are turned off (FIG. 18); and State 12: The switches S6 and S7 are turned on, and the switches S1 to S5 and S8 are turned off (FIG. 19).

In State 11, the electric power conversion circuit 23 disconnects the load 5A from the AC power source 1A and stores, in the reactor L1, the energy of the electric power inputted from the AC power source 1A. In State 12, the electric power conversion circuit 23 superimposes, onto the electric power inputted from the AC power source 1A, the energy stored in the reactor L1 and outputs the resulting electric power to the load 5A. The desired voltage is outputted from the port terminals T3 and T4 by alternately switching between State 11 and State 12 at a time ratio corresponding to the ratio between the input voltage and the desired output voltage.

Figure 20:
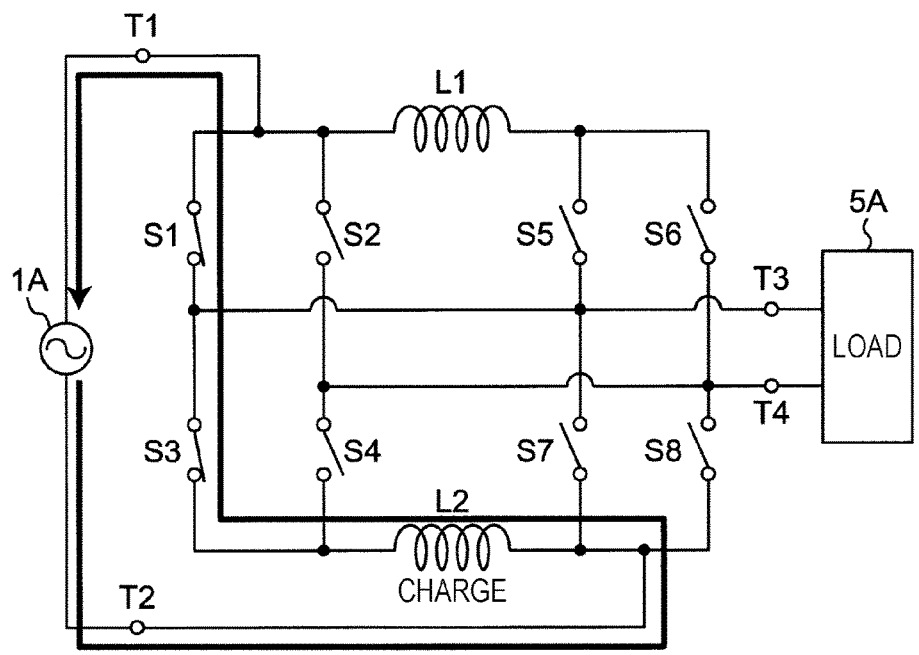
FIG. 20 is a diagram showing an example of a path of current flowing through the electric power conversion circuit according to the embodiment.
Figure 21:
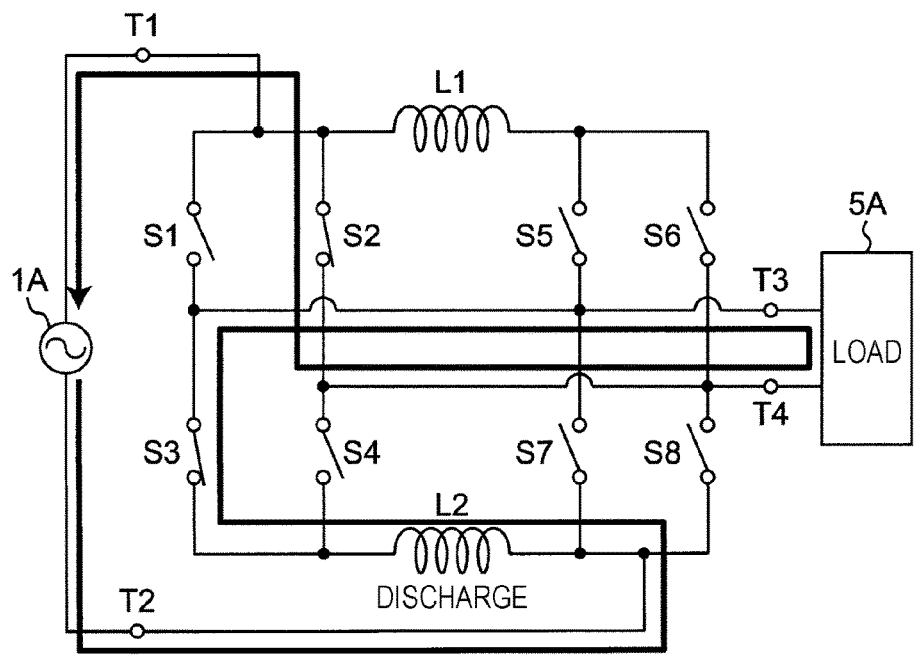
FIG. 21 is a diagram showing an example of a path of current flowing through the electric power conversion circuit according to the embodiment.

FIG. 20 is a diagram showing current flowing in a first period of time during which a negative voltage is applied to the port terminals T1 and T2 and a positive voltage is outputted from the port terminals T3 and T4 in a case where the electric power conversion circuit 23 shown in FIG. 4 operates in the step-up mode. FIG. 21 is a diagram showing current flowing in a second period of time during which a negative voltage is applied to the port terminals T1 and T2 and a positive voltage is outputted from the port terminals T3 and T4 in a case where the electric power conversion circuit 23 shown in FIG. 4 operates in the step-up mode. In this case, the following two switching states are alternately switched between at a time ratio corresponding to the ratio between the input voltage and the desired output voltage:

State 13: The switches S1 and S3 are turned on, and the switches S2 and S4 to S8 are turned off (FIG. 20); and State 14: The switches S2 and S3 are turned on, and the switches S1 and S4 to S8 are turned off (FIG. 21).

In State 13, the electric power conversion circuit 23 disconnects the load 5A from the AC power source 1A and stores, in the reactor L2, the energy of the electric power inputted from the AC power source 1A. In State 14, the electric power conversion circuit 23 superimposes, onto the electric power inputted from the AC power source 1A, the energy stored in the reactor L2 and outputs the resulting electric power to the load 5A. The desired voltage is outputted from the port terminals T3 and T4 by alternately switching between State 13 and State 14 at a time ratio corresponding to the ratio between the input voltage and the desired output voltage.

Figure 22:
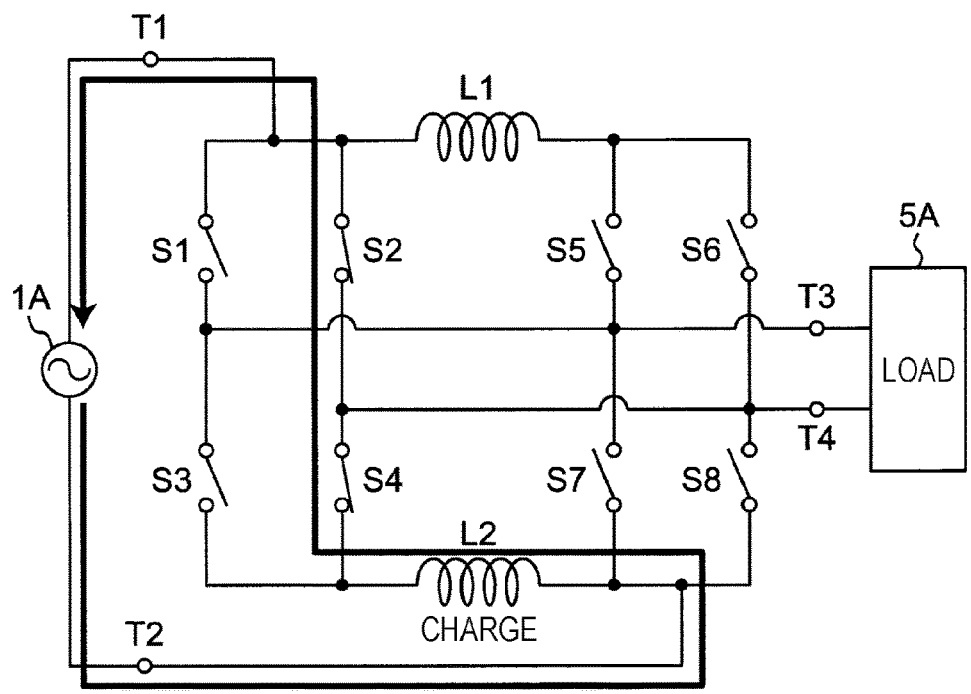
FIG. 22 is a diagram showing an example of a path of current flowing through the electric power conversion circuit according to the embodiment.
Figure 23:
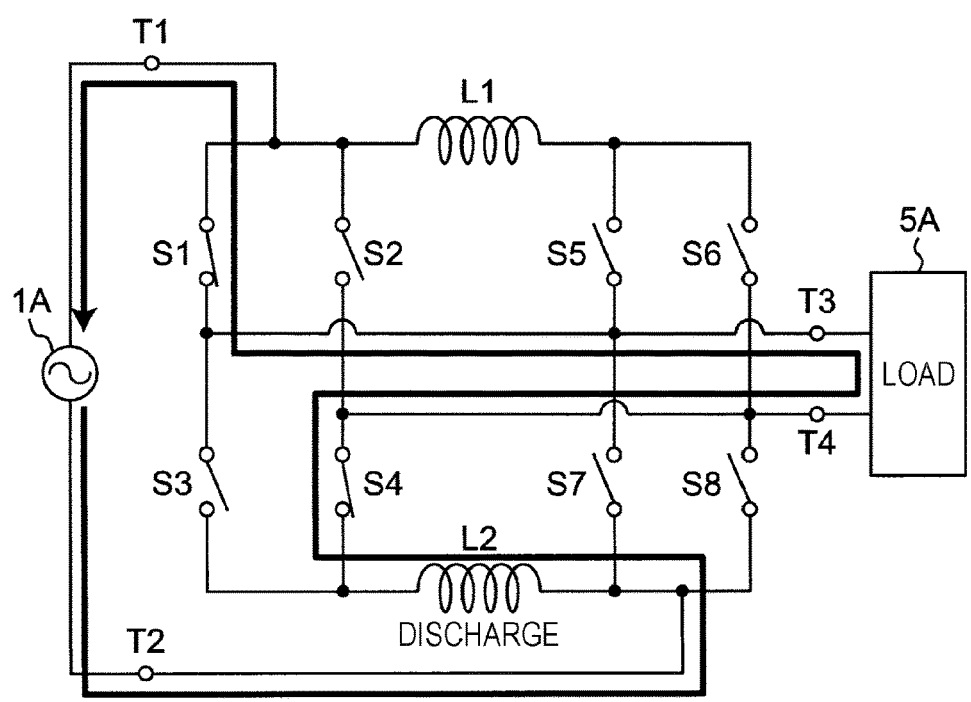
FIG. 23 is a diagram showing an example of a path of current flowing through the electric power conversion circuit according to the embodiment.

FIG. 22 is a diagram showing current flowing in a first period of time during which a negative voltage is applied to the port terminals T1 and T2 and a negative voltage is outputted from the port terminals T3 and T4 in a case where the electric power conversion circuit 23 shown in FIG. 4 operates in the step-up mode. FIG. 23 is a diagram showing current flowing in a second period of time during which a negative voltage is applied to the port terminals T1 and T2 and a negative voltage is outputted from the port terminals T3 and T4 in a case where the electric power conversion circuit 23 shown in FIG. 4 operates in the step-up mode. In this case, the following two switching states are alternately switched between at a time ratio corresponding to the ratio between the input voltage and the desired output voltage:

State 15: The switches S2 and S4 are turned on, and the switches S1, S3, and S5 to S8 are turned off (FIG. 22); and State 16: The switches S1 and S4 are turned on, and the switches S2, S3, and S5 to S8 are turned off (FIG. 23).

In State 15, the electric power conversion circuit 23 disconnects the load 5A from the AC power source 1A and stores, in the reactor L2, the energy of the electric power inputted from the AC power source 1A. In State 16, the electric power conversion circuit 23 superimposes, onto the electric power inputted from the AC power source 1A, the energy stored in the reactor L2 and outputs the resulting electric power to the load 5A. The desired voltage is outputted from the port terminals T3 and T4 by alternately switching between State 15 and State 16 at a time ratio corresponding to the ratio between the input voltage and the desired output voltage.

States 9, 11, 13, and 15 are examples of the "first to fourth charge states" of the present disclosure, respectively. States 10, 12, 14, and 16 are examples of the "first to fourth discharge states" of the present disclosure, respectively.

Contrary to the descriptions in FIGS. 8 to 23, the power source may be connected to the port terminals T3 and T4 of the electric power conversion circuit 23 shown in FIG. 4, and the load may be connected to the port terminals T1 and T2. That is, the pair of port terminals T3 and T4 may serve as an input port, and the pair of port terminals T1 and T2 may serve as an output port. The electric power conversion circuit 23 may convert electric power inputted via the port terminals T3 and T4 and outputs the electric power via the port terminals T1 and T2.

In this case, when the electric power conversion circuit 23 operates in the step-down mode, the switches S1 to S8 are controlled to alternately switch between the following two states:

(1) State in which current returns from the input port via the reactor L1 or L2 and the output port to the input port; and (2) State in which current returns from the reactor L1 or L2 via the output port to the reactor L1 or L2 without passing through the input port.

Therefore, when a positive voltage is applied to the port terminals T3 and T4 and a positive voltage is outputted from the port terminals T1 and T2, State 15 (FIG. 22) and State 16 (FIG. 23) are alternately switched between. When a positive voltage is applied to the port terminals T3 and T4 and a negative voltage is outputted from the port terminals T1 and T2, State 11 (FIG. 18) and State 12 (FIG. 19) are alternately switched between. When a negative voltage is applied to the port terminals T3 and T4 and a positive voltage is outputted from the port terminals T1 and T2, State 13 (FIG. 20) and State 14 (FIG. 21) are alternately switched between. When a negative voltage is applied to the port terminals T3 and T4 and a negative voltage is outputted from the port terminals T1 and T2, State 9 (FIG. 16) and State 10 (FIG. 17) are alternately switched between.

Similarly, when the electric power conversion circuit 23 operates in the step-up mode, the switches S1 to S8 are controlled to alternately switch between the following two states:

(3) State in which current returns from the input port via the reactor L1 or L2 to the input port without passing through the output port; and (4) State in which current returns from the input port via the reactor L1 or L2 and the output port to the input port.

Therefore, when a positive voltage is applied to the port terminals T3 and T4 and a positive voltage is outputted from the port terminals T1 and T2, State 7 (FIG. 14) and State 8 (FIG. 15) are alternately switched between. When a positive voltage is applied to the port terminals T3 and T4 and a negative voltage is outputted from the port terminals T1 and T2, State 3 (FIG. 10) and State 4 (FIG. 11) are alternately switched between. When a negative voltage is applied to the port terminals T3 and T4 and a positive voltage is outputted from the port terminals T1 and T2, State 5 (FIG. 12) and State 6 (FIG. 13) are alternately switched between. When a negative voltage is applied to the port terminals T3 and T4 and a negative voltage is outputted from the port terminals T1 and T2, State 1 (FIG. 8) and State 2 (FIG. 9) are alternately switched between.

By using only States 1, 3, 5, and 7 (or only States 9, 11, 13, and 15) without using States 2, 4, 6, 8, 10, 12, 14, and 16, the electric power conversion circuit 23 shown in FIG. 4 can also convert electric power without lowering or raising the voltage.

Figure 24:
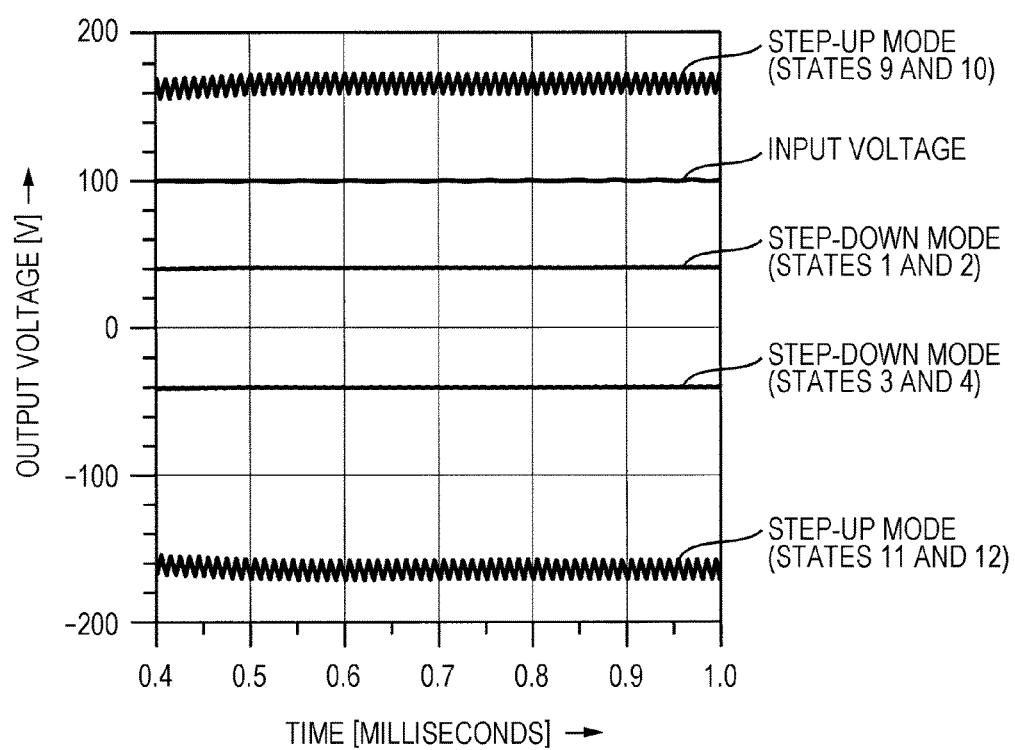
FIG. 24 is a graph showing the results of simulations of operation of the electric power sending apparatus according to the embodiment.

FIG. 24 is a graph showing the results of simulations of the step-down operation of the electric power sending apparatus 2 shown in FIG. 1. FIG. 24 shows that a lowered/raised positive/negative voltage can be outputted from the port terminals T3 and T4 by applying a positive voltage of 100 V to the port terminals T1 and T2 shown in FIG. 4.

Figure 25:
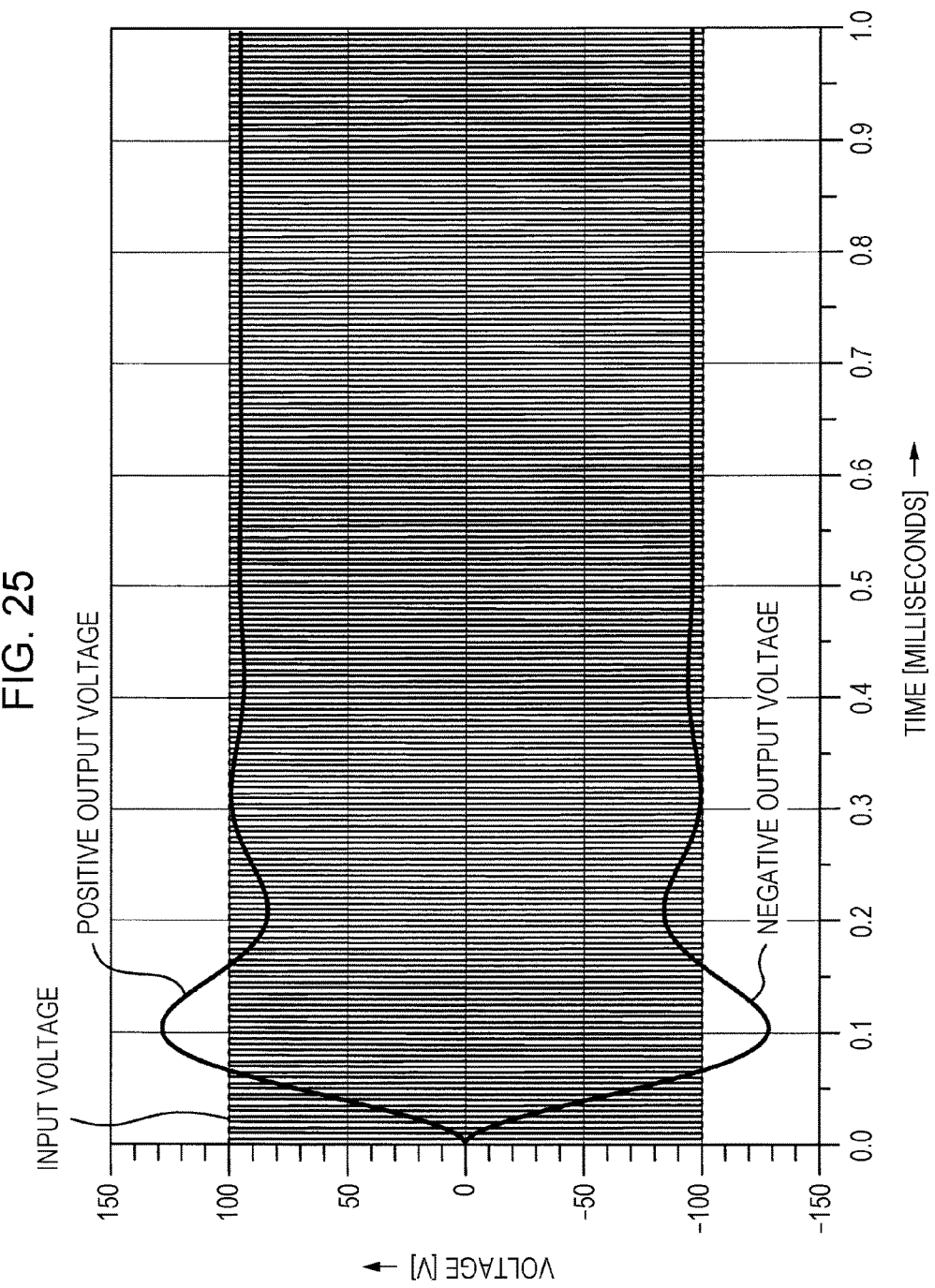
FIG. 25 is a graph showing the result of a simulation of operation of the electric power receiving apparatus according to the embodiment.

FIG. 25 is a graph showing the result of a simulation of operation of the electric power receiving apparatus 4 shown in FIG. 1. FIG. 25 shows a case where when rectangular waves of input power of 100 V and 100 kHz are supplied, the input power is converted into a DC output power of +100 V or −100 V without a rise or drop in voltage. FIG. 25 shows that the desired output power is generated after a transient state of approximately 0.3 milliseconds has elapsed since the start of electric power conversion.

As described above, the electric power conversion circuit 23 shown in FIG. 4 can easily adjust the voltage while being simpler in configuration than the conventional technologies.

The electric power conversion circuit 23 shown in FIG. 4 is operable to bidirectionally convert electric power from the port terminals T1 and T2 toward the port terminals T3 and T4 and vice versa.

An electric power transmission system according to the present embodiment may include at least one group of electric power sending apparatuses that are identical in configuration to the electric power sending apparatus 2 and at least one group of electric power receiving apparatuses that are identical in configuration to the electric power receiving apparatus 4. The electric power conversion circuit 23 of one electric power sending apparatus 2 and the electric power conversion circuit 33 of one electric power receiving apparatus 4 are supplied with the respectively corresponding code sequences. The electric power conversion circuit 23 of the electric power sending apparatus 2 code-modulates, in accordance with the code sequence, electric power inputted from the generator 1 and outputs the electric power to the electric power transmission line 3, and the electric power conversion circuit 33 of the electric power receiving apparatus 4 demodulates, in accordance with the code sequence supplied thereto, electric power inputted from the electric power transmission line 3 and outputs the electric power to the load 5. This makes it possible to transmit electric power from a particular generator 1 to a particular load 5. This makes it possible to introduce an electric power transmission system at low cost by reducing the number of electric power conversion circuits that are used in the electric power transmission system.

In a case where code modulation and code demodulation are used and at least either the electric power sending apparatus 2 or the electric power receiving apparatus 4 lowers or raises the voltage, code sequences for the code modulation and the code demodulation are changed for lowering or raising the voltage. For example, in a case where State 1 (FIG. 8) is allocated to a certain section of a code sequence and when the electric power conversion circuit 23 operates in the step-down mode, the switches S1 to S8 are controlled in this section to alternately switch between State 1 (FIG. 8) and State 2 (FIG. 9). Similarly, in a case where State 10 (FIG. 17) is allocated to a certain section of a code sequence and when the electric power conversion circuit 23 operates in the step-up mode, the switches S1 to S8 are controlled in this section to alternately switch between State 9 (FIG. 16) and State 10 (FIG. 17). In a section of a code sequence to which another state is allocated, the switches S1 to S8 are controlled in a similar way.

Overview of Embodiments

It should be noted that general or specific embodiments may be implemented as a system, a method, an integrated circuit, a computer program, a storage medium, or any selective combination thereof.

An electric power conversion circuit, an electric power sending apparatus, an electric power receiving apparatus, and an electric power transmission system according to the aspects of the present disclosure are configured as follows.

An electric power conversion circuit according to a first aspect of the present disclosure includes: first to fourth port terminals; a first full-bridge circuit including first to fourth switches; a second full-bridge circuit including fifth to eighth switches; and first and second reactors. The first full-bridge circuit includes a first node between the first and second switches, a second node between the third and fourth switches, a third node between the first and third nodes, and a fourth node between the second and fourth switches. The second full-bridge circuit includes a fifth node between the fifth and sixth switches, a sixth node between the seventh and eighth switches, a seventh node between the fifth and seventh switches, and an eighth node between the sixth and eighth switches. The first and fifth nodes are connected to each other via the first reactor. The second and sixth nodes are connected to each other via the second reactor. The first node is connected to the first port terminal. The sixth node is connected to the second port terminal. The third and seventh nodes are connected to the third port terminal. The fourth and eighth nodes are connected to the fourth port terminal.

An electric power conversion circuit according to a second aspect of the present disclosure is the electric power conversion circuit according to the first aspect, wherein the first switch is configured to, when turned on, allow current to flow only from the third node toward the first node, the second switch is configured to, when turned on, allow current to flow only from the fourth node toward the first node, the third switch is configured to, when turned on, allow current to flow only from the second node toward the third node, the fourth switch is configured to, when turned on, allow current to flow only from the second node toward the fourth node, the fifth switch is configured to, when turned on, allow current to flow only from the fifth node toward the seventh node, the sixth switch is configured to, when turned on, allow current to flow only from the fifth node toward the eighth node, the seventh switch is configured to, when turned on, allow current to flow only from the seventh node toward the sixth node, and the eighth switch is configured to, when turned on, allow current to flow only from the eighth node toward the sixth node.

An electric power conversion circuit according to a third aspect of the present disclosure is the electric power conversion circuit according to the second aspect, wherein each of the first to eighth switches includes a MOSFET and a diode, the MOSFET and the diode being connected in series to each other.

An electric power conversion circuit according to a fourth aspect of the present disclosure is the electric power conversion circuit according to the second aspect, wherein each of the first to eighth switches is a bipolar transistor.

An electric power conversion circuit according to a fifth aspect of the present disclosure is the electric power conversion circuit according to any one of the first to fourth aspects, wherein either a pair of the first and second port terminals or a pair of the third and fourth port terminals serves as an input port and the other of the pairs serves as an output port, and when the electric power conversion circuit operates in a step-down mode, the first to eighth switches are controlled to alternately switch between a first state in which current returns from the input port via the first or second reactor and the output port to the input port and a second state in which current returns from the first or second reactor via the output port to the first or second reactor without passing through the input port.

An electric power conversion circuit according to a sixth aspect of the present disclosure is the electric power conversion circuit according to any one of the first to fifth aspects, wherein either a pair of the first and second port terminals or a pair of the third and fourth port terminals serves as an input port and the other of the pairs serves as an output port, and when the electric power conversion circuit operates in a step-up mode, the first to eighth switches are controlled to alternately switch between a third state in which current returns from the input port via the first or second reactor to the input port without passing through the output port and a fourth state in which current returns from the input port via the first or second reactor and the output port to the input port.

An electric power sending apparatus according to a seventh aspect of the present disclosure is an electric power sending apparatus, connected to a power source and an electric power transmission line, which converts a frequency of electric power inputted from the power source and outputs the electric power to the electric power transmission line, the electric power sending apparatus including an electric power conversion circuit according to any one of the first to sixth aspects.

An electric power sending apparatus according to an eighth aspect of the present disclosure is the electric power sending apparatus according to the seventh aspect, wherein the electric power conversion circuit modulates, in accordance with predetermined modulation codes, the electric power inputted and outputs the electric power.

An electric power receiving apparatus according to a ninth aspect of the present disclosure is an electric power receiving apparatus, connected to an electric power transmission line and a load, which converts a frequency of electric power inputted from the electric power transmission line and outputs the electric power to the load, the electric power receiving apparatus including an electric power conversion circuit according to any one of the first to sixth aspects.

An electric power receiving apparatus according to a tenth aspect of the present disclosure is the electric power receiving apparatus according to the ninth aspect, wherein the electric power conversion circuit demodulates, in accordance with predetermined demodulation codes, the electric power inputted and outputs the electric power.

An electric power transmission system according to an eleventh aspect of the present disclosure includes: an electric power sending apparatus group including at least one electric power sending apparatus according to the seventh or eighth aspect; and an electric power receiving apparatus group including at least one electric power receiving apparatus according to the ninth or tenth aspect.

An electric power conversion circuit according to the present disclosure is useful in converting electric power in an AC power system or in an electric power system in which there is a mixture of direct current and alternating current. Further, an electric power transmission system according to the present disclosure is useful in transmitting electric power from a generator such as a photovoltaic power generator, a wind power generator, or a hydraulic power generator to a railroad, an electric vehicle, or the like.

What is claimed is:

1. An electric power conversion circuit comprising:
a first leg including a first switch and a third switch, the first and third switches being connected in series to each other;
a second leg including a second switch and a fourth switch, the second leg being connected in parallel to the first leg, the second and fourth switches being connected in series to each other;
a third leg including a fifth switch and a seventh switch, the fifth and seventh switches being connected in series to each other;
a fourth leg including a sixth switch and an eighth switch, the fourth leg being connected in parallel to the third leg, the sixth and eighth switches being connected in series to each other;
a first reactor connected between a first node, in which the first and second legs are connected to each other, and a fifth node, in which the third and fourth legs are connected to each other;
a second reactor connected between a second node, in which the first and second legs are connected to each other, and a sixth node, in which the third and fourth legs are connected to each other;
a first port terminal connected to the first node;
a second port terminal connected to the sixth node;
a third port terminal connected to a third node between the first and third switches and to a seventh node between the fifth and seventh switches; and
a fourth port terminal connected to a fourth node between the second and fourth switches and to an eighth node between the sixth and eighth switches.

2. The electric power conversion circuit according to claim 1, wherein
the first switch allows current to flow only in a first direction from the third node toward the first node when the first switch is in an on state,
the second switch allows current to flow only in a second direction from the fourth node toward the first node when the second switch is in an on state,
the third switch allows current to flow only in a third direction from the second node toward the third node when the third switch is in an on state,
the fourth switch allows current to flow only in a fourth direction from the second node toward the fourth node when the fourth switch is in an on state,
the fifth switch allows current to flow only in a fifth direction from the fifth node toward the seventh node when the fifth switch is in an on state,
the sixth switch allows current to flow only in a sixth direction from the fifth node toward the eighth node when the sixth switch is in an on state,
the seventh switch allows current to flow only in a seventh direction from the seventh node toward the sixth node when the seventh switch is in an on state, and
the eighth switch allows current to flow only in an eighth direction from the eighth node toward the sixth node when the eighth switch is in an on state.

3. The electric power conversion circuit according to claim 2, wherein each of the first to eighth switches includes a MOSFET and a diode, the MOSFET and the diode being connected in series to each other.

4. The electric power conversion circuit according to claim 2, wherein each of the first to eighth switches is a bipolar transistor.

5. An electric power conversion device comprising:
an electric power conversion circuit according to claim 1; and
a control circuit that controls the first to eighth switches,
wherein either a first pair of the first and second port terminals or a second pair of the third and fourth port terminals serves as an input port and the other of the first and second pairs serves as an output port, and
the control circuit alternately switches between
(A) a charge state in which an input voltage applied to the input port is divided into a charge voltage for charging the first or second reactor and a voltage that is applied to the output port and
(B) a discharge state in which a discharge voltage from the first or second rector is applied to the output port.

6. The electric power conversion device according to claim 5, wherein the first and second switches are connected to the first node,
the third and fourth switches are connected to the second node,
the fifth and sixth switches are connected to the fifth node,
the seventh and eighth switches are connected to the sixth node,
in the charge state, the control circuit selects one of
  (a1) a first charge state in which the fifth and eighth switches are in an on state and the first to fourth, sixth, and seventh switches are in an off state,
  (a2) a second charge state in which the sixth and seventh switches are in an on state and the first to fifth and eighth switches are in an off state,
  (a3) a third charge state in which the second and third switches are in an on state and the first and fourth to eighth switches are in an off state, and
  (a4) a fourth charge state in which the first and fourth switches are in an on state and the second, third, and fifth to eighth switches are in an off state, and
in the discharge state, the control circuit selects one of
  (b1) a first discharge state in which the second and fifth switches are in an on state and the first, third, fourth, and sixth to eighth switches are in an off state,
  (b2) a second discharge state in which the first and sixth switches are in an on state and the second to fifth, seventh, and eighth switches are in an off state,
  (b3) a third discharge state in which the third and eighth switches are in an on state and the first and second to seventh switches are in an off state, and
  (b4) a fourth discharge state in which the fourth and seventh switches are in an on state and the first to third, fifth, sixth, and eighth switches are in an off state.

7. An electric power conversion device comprising:
an electric power conversion circuit according to claim 1; and
a control circuit that controls the first to eighth switches,
wherein either a first pair of the first and second port terminals or a second pair of the third and fourth port terminals serves as an input port and the other of the first and second pairs serves as an output port, and
the control circuit alternately switches between
  (C) a charge state in which an input voltage applied to the input port is applied as a charge voltage to the first or second reactor and
  (D) a discharge state in which a composite voltage of a discharge voltage from the first or second reactor and the input voltage from the input port is applied to the output port.

8. The electric power conversion device according to claim 7, wherein
the first and second switches are connected to the first node,
the third and fourth switches are connected to the second node,
the fifth and sixth switches are connected to the fifth node,
the seventh and eighth switches are connected to the sixth node,
in the charge state, the control circuit selects one of
  (c1) a first charge state in which the fifth and seventh switches are in an on state and the first to fourth, sixth, and eighth switches are in an off state,
  (c2) a second charge state in which the sixth and eighth switches are in an on state and the first to fifth and seventh switches are in an off state,
  (c3) a third charge state in which the first and third switches are in an on state and the second and fourth to eighth switches are in an off state, and
  (c4) a fourth charge state in which the second and fourth switches are in an on state and the first, third, and fifth to eighth switches are in an off state, and in the discharge state, the control circuit selects one of
  (d1) a first discharge state in which the fifth and eighth switches are in an on state and the first to fourth, sixth, and seventh switches are in an off state,
  (d2) a second discharge state in which the sixth and seventh switches are in an on state and the first to fifth and eighth switches are in an off state,
  (d3) a third discharge state in which the second and third switches are in an on state and the first and fourth to eighth switches are in an off state, and
  (d4) a fourth discharge state in which the first and fourth switches are in an on state and the second, third, and fifth to eighth switches are in an off state.

9. An electric power sending apparatus comprising an electric power conversion device according to claim 5, wherein the electric power sending apparatus converts a frequency of electric power inputted from a power source to output the converted electric power to an electric power transmission line.

10. The electric power sending apparatus according to claim 9, wherein the electric power conversion device code-modulates, in accordance with a modulation code, the inputted electric power.

11. An electric power receiving apparatus comprising an electric power conversion device according to claim 5, wherein the electric power receiving apparatus converts a frequency of electric power inputted from an electric power transmission line to output the converted electric power to a load.

12. The electric power receiving apparatus according to claim 11, wherein the electric power conversion device code-demodulates, in accordance with a demodulation code, the inputted electric power.

13. An electric power transmission system comprising:
an electric power sending apparatus connected to a power source;
an electric power receiving apparatus connected to a load; and
an electric power transmission line connecting the electric power sending apparatus and the electric power receiving apparatus to each other,
wherein the electric power sending apparatus and the electric power receiving apparatus each include an electric power conversion device according to claim 5,
the electric power sending apparatus code-modulates electric power of the power source in accordance with a modulation code and sends the code-modulated electric power to the electric power transmission line, and
the electric power receiving apparatus receives the code-modulated electric power from the electric power transmission line and code-demodulates the code-modulated electric power in accordance with a demodulation code corresponding to the modulation code.

* * * * *